(12) United States Patent
Shimane et al.

(10) Patent No.: US 10,677,171 B2
(45) Date of Patent: Jun. 9, 2020

(54) ANGLE DETECTION MECHANISM AND ANGLE DETECTION SYSTEM

(71) Applicant: DENSO CORPORATION, Kariya, Aichi-pref. (JP)

(72) Inventors: Osamu Shimane, Kariya (JP); Tohru Shimizu, Kariya (JP); Yuta Fujinaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/323,013

(22) PCT Filed: Jul. 28, 2017

(86) PCT No.: PCT/JP2017/027372
§ 371 (c)(1),
(2) Date: Feb. 4, 2019

(87) PCT Pub. No.: WO2018/042970
PCT Pub. Date: Aug. 3, 2018

(65) Prior Publication Data
US 2019/0186385 A1 Jun. 20, 2019

(30) Foreign Application Priority Data
Sep. 5, 2016 (JP) .................. 2016-172939

(51) Int. Cl.
F02D 11/10 (2006.01)
F02D 9/02 (2006.01)
(Continued)

(52) U.S. Cl.
CPC .............. *F02D 11/107* (2013.01); *F02D 9/00* (2013.01); *F02D 9/02* (2013.01); *F02D 9/10* (2013.01);
(Continued)

(58) Field of Classification Search
CPC ......... F02D 2400/08; F02D 2009/0294; F02D 9/105
See application file for complete search history.

(56) References Cited

U.S. PATENT DOCUMENTS 5,260,877 A 11/1993 Drobny et al.
5,452,697 A 9/1995 Sasaki et al.
(Continued)

FOREIGN PATENT DOCUMENTS

JP 03-233317 10/1991
JP 06-93921 4/1994
(Continued)

Primary Examiner — Kevin R Steckbauer
(74) Attorney, Agent, or Firm — Nixon & Vanderhye P.C.

(57) ABSTRACT

An angle detection mechanism to detect a rotation angle of a rotation body includes a first detection unit to cause a first output value to constantly change in response to an angle change of the rotation body in the entire region of a specific rotation range and to set a change quantity of the first output value relative to the angle change in a first rotation region of the specific rotation range to be greater than a change quantity in a non-first rotation region, and a second detection unit to cause a second output value to constantly change in response to an angle change and to set a change quantity of the second output value in a second rotation region including a rotation region different from the first rotation region to be greater than a change quantity in a non-second rotation region.

7 Claims, 19 Drawing Sheets

(51) Int. Cl.
  *F02D 9/10* (2006.01)
  *F02D 45/00* (2006.01)
  *F02D 9/00* (2006.01)
  *G01B 21/22* (2006.01)
  *G01B 7/30* (2006.01)
  *G01D 5/14* (2006.01)

(52) U.S. Cl.
  CPC .............. *F02D 9/105* (2013.01); *F02D 11/10* (2013.01); *F02D 11/106* (2013.01); *F02D 45/00* (2013.01); *G01B 7/30* (2013.01); *G01B 21/22* (2013.01); *G01D 5/145* (2013.01); *F02D 2009/0294* (2013.01); *F02D 2400/08* (2013.01)

(56) References Cited

U.S. PATENT DOCUMENTS

| | | | | |
|---|---|---|---|---|
| 6,276,332 B1 * | 8/2001 | Storhok | ................ | F02D 11/106 123/361 |
| 6,499,461 B2 * | 12/2002 | Kubota | ................ | F02D 11/106 123/361 |
| 6,593,732 B2 * | 7/2003 | Dammkohler | ............ | F02D 9/10 29/827 |
| 6,946,831 B2 * | 9/2005 | Miyata | .................... | F02D 9/105 123/617 |
| 7,111,610 B2 * | 9/2006 | Nidigattu | .............. | F02D 11/105 123/396 |
| 7,340,337 B2 * | 3/2008 | Katrak | ...................... | F02D 9/02 123/376 |
| 9,448,054 B2 * | 9/2016 | Nomura | .................. | G01B 7/30 |
| 2001/0004215 A1 * | 6/2001 | Kubota | ................. | F02D 11/106 324/685 |
| 2002/0067162 A1 * | 6/2002 | Dammkohler | ............ | F02D 9/10 324/207.21 |
| 2004/0085062 A1 * | 5/2004 | Miyata | .................... | F02D 9/105 324/207.2 |
| 2005/0120999 A1 * | 6/2005 | Nidigattu | .............. | F02D 11/105 123/399 |
| 2006/0206252 A1 * | 9/2006 | Katrak | ...................... | F02D 9/02 701/70 |
| 2013/0257416 A1 * | 10/2013 | Nomura | .................. | G01B 7/30 324/207.13 |

FOREIGN PATENT DOCUMENTS

| | | |
|---|---|---|
| JP | 2007-303925 | 11/2007 |
| JP | 2012-107929 | 6/2012 |

* cited by examiner

ANGLE DETECTION MECHANISM AND ANGLE DETECTION SYSTEM

This application is the U.S. national phase of International Application No. PCT/JP2017/027372 filed Jul. 28, 2017 which designated the U.S. and claims priority to Japanese Patent Application No. 2016-172939 filed on Sep. 5, 2016, the entire contents of each of which are incorporated herein by reference.

CROSS-REFERENCE TO RELATED APPLICATION

This application is based on Japanese Patent Application No. 2016-172939 filed on Sep. 5, 2016, the disclosure of which is incorporated herein by reference.

TECHNICAL FIELD

The present disclosure relates to a technology of an angle detection that detects a rotation angle of a rotation body.

BACKGROUND ART

Conventionally, for example, according to Patent Literature 1, an angle detection mechanism that detects a rotation angle of a throttle valve being a rotation body is provided in an electronic-control throttle-valve device and the like. Then angle detection mechanism includes one throttle position sensor. The throttle position sensor can execute an angle detection of the throttle valve at a control unit, by causing an output voltage transmitted to the control unit to change in response to an angle change of the throttle valve.

In a configuration disclosed in Patent Literature 1, the output voltage of the throttle position sensor is amplified by an amplifier in a low-opening degree region where an opening degree of the throttle valve is small. According to the above, since a resolution of the angle detection in the low-opening degree region can be decreased, the control unit can detect the rotation angle of the throttle valve in the low-opening degree region with a high precision.

PRIOR ART LITERATURE

Patent Literature

Patent Literature 1: JPH10-169475A

SUMMARY OF INVENTION

When the throttle position sensor fails, it is possible that the output voltage does not change even though the rotation angle of the throttle valve changes. However, in the configuration of Patent Literature 1, when the output voltage does not change, the control unit cannot distinguish between that the output voltage does not change while the angle change of the throttle valve does not occur and that the output voltage does not change due to a failure of the throttle position sensor. Thus, it is difficult for the control unit to detect a failure of a detection unit such as the throttle position sensor and the like.

Further, as an example, when a throttle valve device according to Patent Literature 1 is applied to a diesel engine, the throttle valve is controlled to be fully open in a normal operation. When a precision of the angle detection in a high-opening degree region as the above is deteriorated, it is possible that an intake pressure loss is generated due to the throttle valve which is unfully open. To prevent the above matters, it is necessary to achieve the angle detection with a high precision not only in the low-opening degree region but also in the high-opening degree region, for example.

It is an object of the present disclosure to provide a technology of an angle detection which can execute a failure detection of a detection unit at the entire of a rotation range that is predetermined and can enlarge a rotation region where an angle detection is executed with a high precision.

According to a first aspect of the present disclosure, the angle detection mechanism to detect a rotation angle of a rotation body by using a plurality of detection units which have different output characteristics includes a first detection unit to cause an output value to constantly change in response to an angle change of the rotation body in the entire region of a specific rotation range of the rotation body which is previously defined, the first detection unit to set a change quantity of the output value relative to the angle change that is predetermined in a first rotation region that is a part of the specific rotation range to be greater than a change quantity in a rotation region other than the first rotation region, and a second detection unit to cause an output value to constantly change in response to an angle change of the rotation body in the entire region of the specific rotation range, the second detection unit to set a change quantity of the output value relative to the angle change that is predetermined in a second rotation region defined to include a rotation region in the specific rotation range different from the first rotation region to be greater than a change quantity in a rotation region other than the second rotation region.

According to the first aspect, the first detection unit and the second detection unit cause the output values to constantly change in response to the angle change of the rotation body in the specific rotation range of the rotation body. Thus, an external failure detection device electrically connected with the angle detection mechanism can diagnose one of the first detection unit and the second detection unit fails based on that only one of the output values of the first detection unit and the second detection unit does not change, in the entire region of the specific rotation range.

In addition, in the first detection unit and the second detection unit, the change quantities of the output values relative to the angle change that is predetermined are set to be greater than those of rotation regions of the specific rotation region other than the first rotation region and the second rotation region. Further, the second rotation region is defined to include a rotation region in the specific rotation range different from the first rotation region. Thus, a detection of the rotation angle can be executed with a high precision in plural regions or a wide region in the specific rotation range.

As the above description, the angle detection mechanism where the first detection unit and the second detection unit that have different output characteristics and are combined can execute a failure detection in the entire region of the specific detection range and can enlarge a range to execute an angle detection with a high precision.

According to a second aspect of the present disclosure, the angle detection system includes an angle detection mechanism to detect a rotation angle of a rotation an angle detection mechanism to detect a rotation angle of a rotation body by using a plurality of detection units which have different output characteristics, and an angle determination unit to select a selection detection unit using an output value among the plurality of the detection units, the angle determination unit to determine an angle position of the rotation body based on the output value of the selection detection unit. The angle detection mechanism includes a first detection unit to cause an output value to constantly change in response to an angle change of the rotation body in the entire region of a specific rotation range of the rotation body which is previously defined, the first detection unit to set a change quantity of the output value relative to the angle change that is predetermined in a first rotation region that is a part of the specific rotation range to be greater than a change quantity in a rotation region other than the first rotation region, and a second detection unit to cause an output value to constantly change in response to an angle change of the rotation body in the entire region of the specific rotation range, the second detection unit to set a change quantity of the output value relative to the angle change that is predetermined in a second rotation region defined to include a rotation region in the specific rotation range different from the first rotation region to be greater than a change quantity in a rotation region other than the second rotation region. The second rotation region is set to include a rotation region of a specific rotation direction of the rotation body relative to the first rotation region. The angle determination unit is to switch the selection detection unit from the first detection unit to the second detection unit at a first switching angle in response to a rotation of the rotation body from the first rotation region in the specific rotation direction, and switch the selection detection unit from the second detection unit to the first detection unit at a second switching angle in response to the rotation of the rotation body from the second rotation region in a direction opposite to the specific rotation direction. The first switching angle is set to be in the specific rotation direction relative to the second switching angle.

According to the above aspect, since the first switching angle where the selection detection unit is switched from the first detection unit to the second detection unit, and the second switching angle where the selection detection unit is switched from the second detection unit to the first detection unit, are set to be different, a hysteresis is defined at the switching of the selection detection unit. Thus, it is prevented that a hunting occurs in the switching between the first detection unit and the second detection unit due to a variation of the rotation angle of the rotation body.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
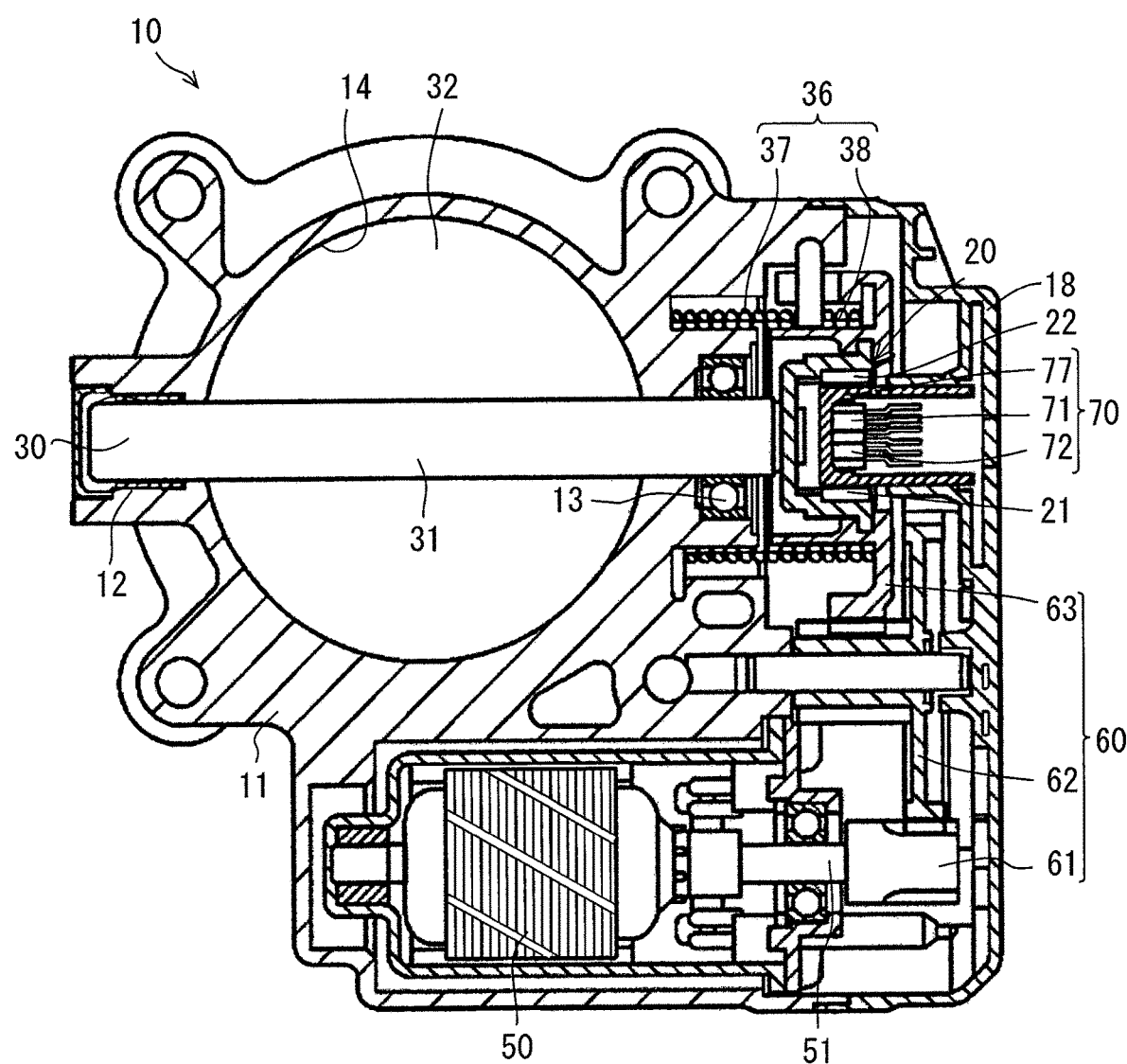
FIG. 1 is a cross-sectional view showing a constitution of an electronic control throttle device to which an angle detection mechanism is applied, according to a first embodiment of the present disclosure.

Hereinafter, embodiments of the present disclosure will be described with reference to the drawings. It is noted that the same reference numerals are attached to the corresponding constituent elements in each embodiment, and redundant explanation may be omitted. In each of the embodiments, when only a part of the configuration is described, the other parts of the configuration can be applied to the other embodiments. Further, it is possible to not only combine configurations as specified in the description of the embodiments but also partially combine configurations of embodiments even though not specified herein as long as the combination poses no problem. Moreover, combinations of configurations mentioned in embodiments and modifications which are not disclosed are assumed to be disclosed by following description.

First Embodiment

Figure 2:
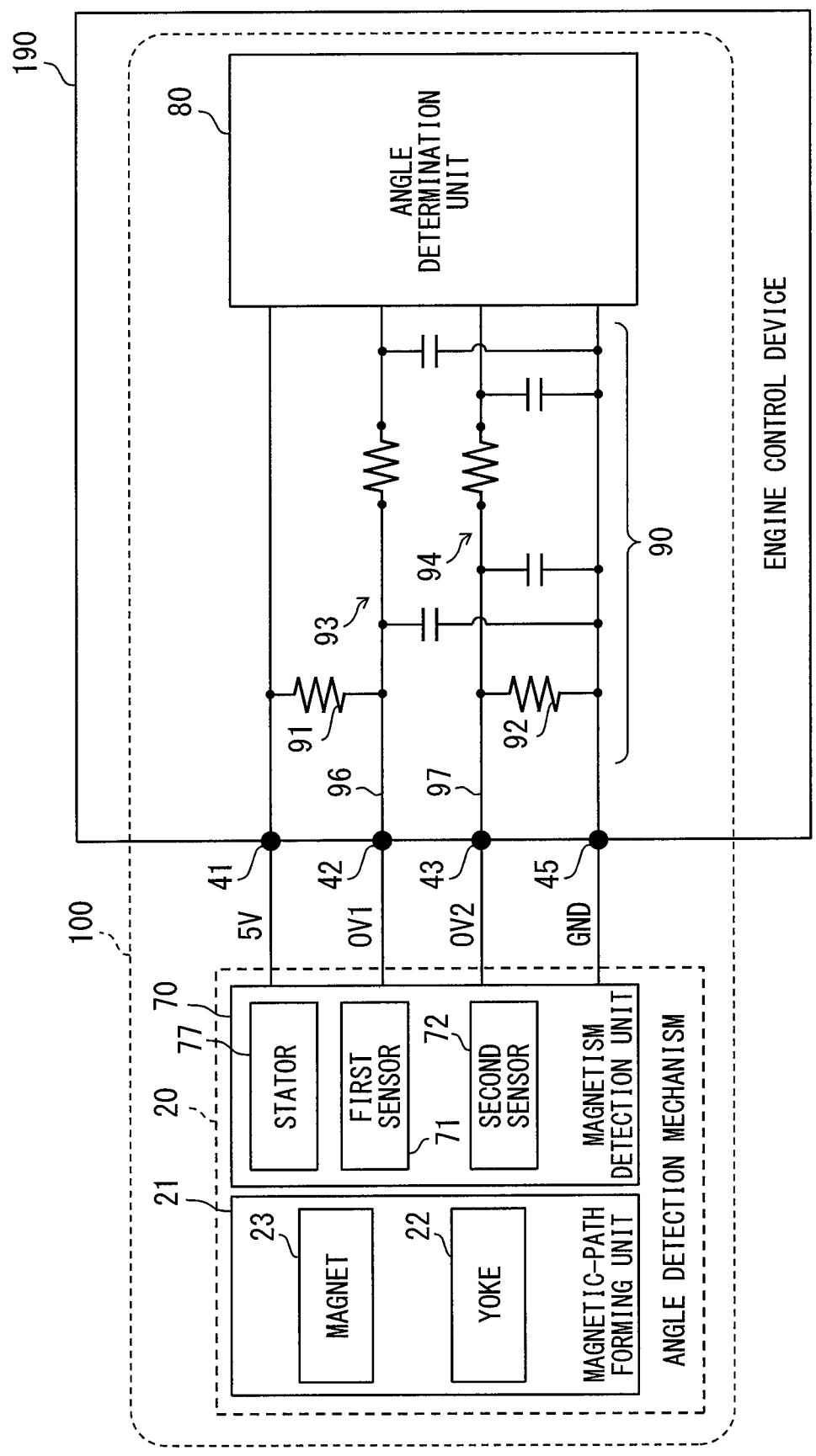
FIG. 2 is a block diagram showing an outline of an angle detection system including the angle detection mechanism.

An angle detection mechanism 20 according to a first embodiment of the present disclosure shown in FIGS. 1 and 2 is applied to an electronic control throttle device 10. The electronic control throttle device 10 is located in an intake system of an internal combustion engine and functions as an intake throttle valve that controls a flow rate of an air supplied to each of cylinders through an intake passage. The electronic control throttle device 10 is electrically connected with an engine control device 190 that controls the internal combustion engine. The engine control device 190 generally generates a control signal based on a pressing operation quantity of an accelerator pedal caused by a driver and outputs the control signal to the electronic control throttle device 10. The electronic control throttle device 10 causes an opening degree of a throttle valve 30 to increase or decrease based on the control signal received from the engine control device 190.

The electronic control throttle device 10 and the angle detection mechanism 20 include a throttle body 11, the throttle valve 30, a spring mechanism 36, a throttle motor 50 and a reduction mechanism 60.

The throttle body 11 is made of a metal material. A throttle passage unit 14 and a pair of rotation support units 12 and 13 are located at the throttle body 11. The throttle passage unit 14 is a cylindrical tubular shape at the throttle body 11 and constitutes a part of the intake passage through which the air introduced to each of the cylinders passes. The rotation support units 12 and 13 sandwich the throttle passage unit 14 therebetween in a radial direction of the throttle passage unit 14 to be located at the throttle body 11. The rotation support units 12 and 13 are a bearing unit that rotatably supports the throttle valve 30 received in the throttle passage unit 14. A gear cover 18 made of a resin material is attached to the throttle body 11. A receiving space between the throttle body 11 and the gear cover 18 receives the spring mechanism 36, the throttle motor 50, the reduction mechanism 60 and the angle detection mechanism 20.

The throttle valve 30 is a rotation body that includes a throttle shaft 31 and a throttle-valve main body 32. The throttle shaft 31 is a columnar shape and is made of a metal material. End parts of the throttle shaft 31 in an axial direction of the throttle shaft 31 are rotatably supported by the rotation support units 12 and 13, respectively.

The throttle-valve main body 32 is a disc shape and is made of a metal material. The throttle-valve main body 32 includes an outer diameter substantially the same as an inner diameter of the throttle passage unit 14. The throttle-valve main body 32 is held by the throttle shaft 31 when received in the throttle passage unit 14. The throttle-valve main body 32 causes an opening area through which the air can pass to change in the throttle passage unit 14, by integrally rotating with the throttle shaft 31 in the throttle passage unit 14. The throttle-valve main body 32 causes a flow rate of a fluid (air) that flows through the throttle passage unit 14 and is suctioned to each of the cylinders to increase or decrease by the above operation.

According to the above constitution, a rotation angle of the throttle-valve main body 32 that substantially closes the throttle passage unit 14 becomes in a fully closed position of the throttle valve 30. The rotation angle of the throttle-valve main body 32 that cause the flow rate of the fluid flowing through the throttle passage unit 14 to be maximum is in a fully open position of the throttle valve 30. In other words, the throttle-valve main body 32 in the fully closed position is parallel to a planar direction of a cross section of the throttle passage unit 14. The throttle-valve main body 32 in the fully open position is parallel to a planar direction of a longitudinal section of the throttle passage unit 14. In following description, a rotation range from the fully closed position to the fully open position, which is substantially 90 degrees, is a specific rotation range of the throttle valve 30 which is previously established, and is equivalent to a movable range RM (refer to FIG. 3) of the throttle valve 30 in the first embodiment. The specific rotation range is a range necessary for a failure detection.

The spring mechanism 36 includes a return spring 37 and a default spring 38. The return spring 37 and the default spring 38 are torsion coil springs made of a metal material. The return spring 37 is configured to apply a rotation force to the throttle shaft 31 in a direction to close the throttle valve 30. The default spring 38 is configured to apply a rotation force opposite to the rotation force of the return spring 37 to the throttle shaft 31 in a direction to open the throttle valve 30.

The throttle motor 50 is a direct current motor. The throttle motor 50 includes an output shaft 51. A rotation operation of the output shaft 51 is controlled by the control signal of the engine control device 190. The throttle motor 50 includes a main part held by the throttle body 11. The throttle motor 50 is configured to cause the output shaft 51 to generate torques in two directions that are a normal direction and an inverse direction based on the control signal and is configured to cause the torques generated at the output shaft 51 to increase or decrease. The torques generated at the output shaft 51 are transmitted to the throttle valve 30 by the reduction mechanism 60.

The reduction mechanism 60 is a mechanism that decelerates a rotation of the output shaft 51 and transmits to the throttle valve 30. The reduction mechanism 60 is constituted by a pinion gear 61, a gear rotor 63 and an intermediate gear 62. The pinion gear 61 is fixed to the output shaft 51 and transmits the torque of the output shaft 51 to the intermediate gear 62. The gear rotor 63 is fixed to one end part of the throttle shaft 31 and integrally rotates with the throttle valve 30. The intermediate gear 62 includes a large-diameter gear that engages with the pinion gear 61 and a small-diameter gear that engages with the gear rotor 63. The intermediate gear 62 transmits a rotation torque received by the large-diameter gear from the pinion gear 61 to the gear rotor 63 through the small-diameter gear.

The angle detection mechanism 20 is a mechanism that detects a rotation angle of the throttle valve 30. The angle detection mechanism 20 includes a magnetic-path forming unit 21 and a magnetism detection unit 70. The magnetic-path forming unit 21 is a substantially cylindrical shape as a whole. The magnetic-path forming unit 21 is laid in the gear rotor 63 by insert molding at a position where an axial direction of the magnetic-path forming unit 21 is parallel to the axial direction of the throttle shaft 31, and the magnetic-path forming unit 21 integrally rotates with the throttle valve 30. According to the present embodiment, the rotation angle of the throttle valve 30 is referred to as a throttle valve opening degree (SV opening degree).

The magnetic-path forming unit 21 includes a pair of yokes 22 and a pair of magnets 23. Each of the yokes 22 is a curved shape of a semi-cylindrical shape and is made of a soft magnetic material having a high magnetic permeability. The yokes 22 are located at positions to surround a periphery of the throttle shaft 31 and to be opposite to each other at two sides of the throttle shaft 31 in a radial direction of the throttle shaft 31. Each of the magnets 23 is a permanent magnet. The magnets 23 are located at two gap parts between the yokes 22, respectively. Each of the magnets 23 applies a magnetic flux of an N pole to one of the yokes 22 and applies a magnetic flux of an S pole to the other one of the yokes 22. Then, a magnetic field to be applied to the magnetism detection unit 70 is generated at an inner periphery of the magnetic-path forming unit 21.

The magnetism detection unit 70 is held at the gear cover 18 and is located at the inner periphery of the magnetic-path forming unit 21. The magnetism detection unit 70 rotates relative to the magnetic-path forming unit 21 by a rotation operation of the throttle valve 30 causing the throttle-valve main body 32 to open and close. The magnetism detection unit 70 transmits an output value (output voltage) in response to the throttle valve opening degree to the engine control device 190, by measuring a relative angle phase of the magnetic-path forming unit 21 without contact.

The magnetism detection unit 70 is constituted by a stator 77, a first sensor 71 and a second sensor 72. The stator 77 is a flat substantially cylindrical shape and is made of a soft magnetic material. The stator 77 is located to be coaxial with the magnetic-path forming unit 21 at a position where an axial direction of the stator 77 is parallel to the axial direction of the throttle shaft 31. Two magnetic detection gaps are located at the stator 77. Each of the magnetic detection gaps is a through hole that penetrates the stator 77 in the axial direction of the stator 77 and receives one of the first sensor 71 and the second sensor 72.

Each of the first sensor 71 and the second sensor 72 is a Hall IC that integrates a Hall element and a signal processing circuit. The first sensor 71 and the second sensor 72 are held by the stator 77 by being received by the magnetic detection gaps. A magnetic field caused by the magnetism detection unit 70 is applied to the first sensor 71 and the second sensor 72. Each of the first sensor 71 and the second sensor 72 includes three terminals that are an output terminal part, a power source terminal part and a ground terminal part. The output parts of the first sensor 71 and the second sensor 72 output output values in response to magnetic densities passing through the Hall elements.

Each of the signal processing circuits is constituted by an A/D converter, a digital signal processor (DSP), an EEPROM (registered trademark), a D/A converter and a buffer circuit part. An output voltage of the Hall element is converted to a digital signal by the A/D converter and then is transmitted to the DSP. The DSP executes an offset adjustment to correct an offset of the output voltage and a clamp adjustment to set a maximum output voltage and a minimum output voltage, based on a set value previously stored in the EEPROM. In addition, the DSP executes a gain adjustment to set a correlation between a voltage output by the DSP and the output voltage of the Hall element which is received.

Figure 3:
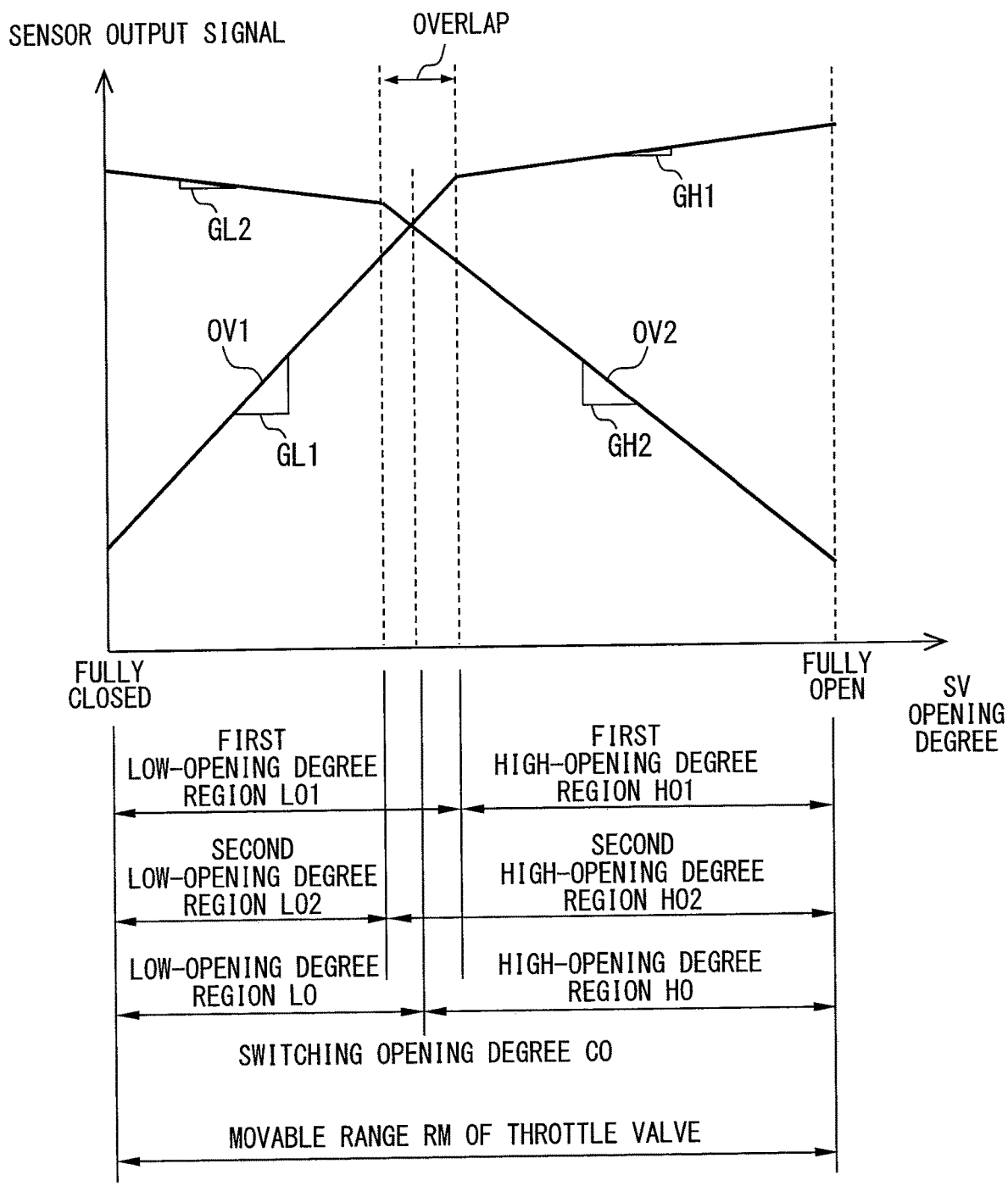
FIG. 3 is a graph showing a correlation of a throttle valve opening degree and an output value of each sensor.

A mode of a change of the output voltage relative to the throttle valve opening degree is defined by the above gain adjustment (refer to FIG. 3). According to the gain adjustment, the first sensor 71 and the second sensor 72 are set as detection units which have different output characteristics. The output voltage adjusted by the DSP is converted to an analog signal by the D/A converter and then is transmitted to the output terminal part through the buffer circuit part. In following description, an output value of the first sensor 71 is referred to as a first output value OV1, and an output value of the second sensor 72 is referred to as a second output value OV2.

As described above, the angle detection mechanism 20 detects the throttle valve opening degree by the first sensor 71 and the second sensor 72 and outputs a detection result to the engine control device 190. The angle detection mechanism 20 constitutes an angle detection system 100 that detects the throttle valve opening degree, together with a detection circuit 90 and an angle determination unit 80 in the engine control device 190.

The detection circuit 90 includes a power supply terminal 41, a first output terminal 42, a second output terminal 43 and a ground terminal 45 which are electrically connected with the magnetism detection unit 70. The power supply terminal 41 supplies a power voltage such as 5V to each of the power terminal parts of the first sensor 71 and the second sensor 72. The first output value OV1 output by the output terminal part of the first sensor 71 is supplied to the first output terminal 42. The second output value OV2 output by the output terminal part of the second sensor 72 is supplied to the second output terminal 43. The ground terminal 45 supplies a ground voltage to the ground terminal parts of the first sensor 71 and the second sensor 72.

The detection circuit 90 is provided with a pull-up resistor 91, a pull-down resistor 92 and filter circuit parts 93 and 94. The pull-up resistor 91 is located between a power supply wiring part and an output wiring part 96. The power supply wiring part connects between the power supply terminal 41 and the angle determination unit 80, and the output wiring part 96 connects between the first output terminal 42 and the angle determination unit 80. The pull-down resistor 92 is located between an output wiring part 97 and a ground wiring part. The output wiring part 97 connects between the second output terminal 43 and the angle determination unit 80, and the ground wiring part connects between the ground terminal 45 and the angle determination unit 80. Each of the filter circuit parts 93 and 94 is constituted by a resistor and a pair of capacitors. The filter circuit parts 93 and 94 are located at the output wiring parts 96 and 97 and function to reduce a noise.

The angle determination unit 80 is a functional block configured at the engine control device 190 based on a program for example, or is an exclusive circuit part located at the engine control device 190. The angle determination unit 80 obtains the first output value OV1 of the first sensor 71 and the second output value OV2 of the second sensor 72 by the detection circuit 90. The angle determination unit 80 determines the throttle valve opening degree that is an angle position of the throttle valve 30, by using only one of the first output value OV1 and the second output value OV2. The engine control device 190 feedback controls the throttle motor 50 such that the throttle valve opening degree determined as the above becomes a target opening degree corresponding to an operation state of the internal combustion engine.

In addition, the angle determination unit 80 detects a failure of the first sensor 71 and the second sensor 72 by comparing the first output value OV1 and the second output value OV2. It is possible that the output values of the first sensor 71 and the second sensor 72 do not change due to the failure. The angle determination unit 80 is configured to detect the above failure of the first sensor 71 and the second sensor 72. The engine control device 190 functions as a failure detection device outside the angle detection mechanism 20, by the above operation of the angle determination unit 80.

Next, correlation between the throttle valve opening degree, the first output value OV1 and the second output value OV2 will be detailed based on FIG. 3 by referring to FIGS. 1 and 2. FIG. 3 shows a correlation line that indicates a change of the first output value OV1 relative to the throttle valve opening degree and a correlation line that indicates a change of the second output value OV2 relative to the throttle valve opening degree. Each of the correlation lines are previously defined to be a shape where two straight line parts of the each of the correlation lines with different slopes are connected with each other. Each of the correlation lines are defined to have a slope that is not zero.

The first sensor 71 constantly changes the first output value OV1 in response to an angle change of the throttle valve 30 in an entire region of the movable range RM of the throttle valve 30 from the fully closed position to the fully open position. When the rotation direction of the throttle valve 30 causing the throttle valve opening degree to increase is a specific rotation direction, the first sensor 71 monotonously causes the first output value OV1 to increase in response to the angle change of the throttle valve 30. In other words, when the throttle valve opening degree increases, the first sensor 71 causes the first output value OV1 to increase only between an increase and a decrease.

In addition, at the first sensor 71, a first low-opening degree region LO1 and a first high-opening degree region HO1 are set. The first low-opening degree region LO1 is a part of the movable range RM and is set in a region where the throttle valve opening degree is lower than that of the first high-opening degree region HO1. The first high-opening degree region HO1 is an opening degree region in the movable range RM other than the first low-opening degree region LO1 and is set in a region where the throttle valve opening degree is higher than that of the first low-opening degree region LO1.

A change quantity of the first output value OV1 relative to a predetermined change of an angle (opening degree) of the throttle valve 30, in the first low-opening degree region LO1 is set to be greater than the change quantity of the first output value OV1 relative to the change of the predetermined angle in the first high-opening degree region HO1. Thus, in the correlation line that indicates the correlation between the throttle valve opening degree and the first output value OV1, a part of the first low-opening degree region LO1 is bent relative to a part of the first high-opening degree region HO1. In addition, a slope GL1 of the part of the first low-opening degree region LO1 is greater than a slope GH1 of the part of the first high-opening degree region HO1. According to the above setting of the first sensor 71, the angle determination unit 80 is configured to detect the change of the opening degree (angle) of the throttle valve 30 in the first low-opening degree region LO1 by a resolution higher than that of the first high-opening degree region HO1.

Similar to the first sensor 71, the second sensor 72 constantly changes the second output value OV2 in response to the angle change of the throttle valve 30 in the entire region of the movable range RM of the throttle valve 30 from the fully closed position to the fully open position. The second sensor 72 monotonously causes the second output value OV2 to increase in response to the angle change of the throttle valve 30 in the specific rotation direction. In other words, when the throttle valve opening degree increases, the second sensor 72 causes the second output value OV2 to increase only between an increase and a decrease.

In addition, at the second sensor 72, a second low-opening degree region LO2 and a second high-opening degree region HO2 are set. The second low-opening degree region LO2 is a part of the movable range RM and is set in a region where the throttle valve opening degree is lower than that of the second high-opening degree region HO2. The second high-opening degree region HO2 is an opening degree region in the movable range RM other than the second low-opening degree region LO2 and is set in a region where the throttle valve opening degree is higher than that of the second low-opening degree region LO2.

A change quantity of the second output value OV2 relative to the change of the predetermined angle of the throttle valve 30, in the second high-opening degree region HO2 is set to be greater than the change quantity of the second output value OV2 relative to the predetermined change of the angle in the second low-opening degree region LO2. Thus, in the correlation line that indicates the correlation between the throttle valve opening degree and the second output value OV2, a part of the second low-opening degree region LO2 is bent relative to a part of the second high-opening degree region HO2. In addition, a slope GH2 of the part of the second high-opening degree region HO2 is greater than a slope GL2 of the part of the second low-opening degree region LO2. According to the above setting of the second sensor 72, the angle determination unit 80 is configured to detect the change of the angle of the throttle valve 30 in the second high-opening degree region HO2 by a resolution higher than that of the second low-opening degree region LO2. In addition, a magnitude of each of the above slopes is a value indicated by an absolute value.

According to the magnetism detection unit 70 as the above description, a detection of a higher resolution based on the first output value OV1 in the first low-opening degree region LO1 is possible and a detection of a higher resolution based on the second output value OV2 in the second high-opening degree region HO2 is possible. The second high-opening degree region HO2 is defined in the movable range RM to include an opening degree region different from the first low-opening degree region LO1 where the resolution of the first output value OV1 becomes higher, and is defined to include an opening degree region having the throttle valve opening degree higher than that of the first low-opening degree region LO1. Further, a part of a high-opening degree side of the first low-opening degree region LO1 overlaps a low-opening degree side of the second high-opening degree region HO2, and a range where the detection can be executed by a high resolution is caused to overlap the low-opening degree side of the second high-opening degree region HO2.

Figure 4:
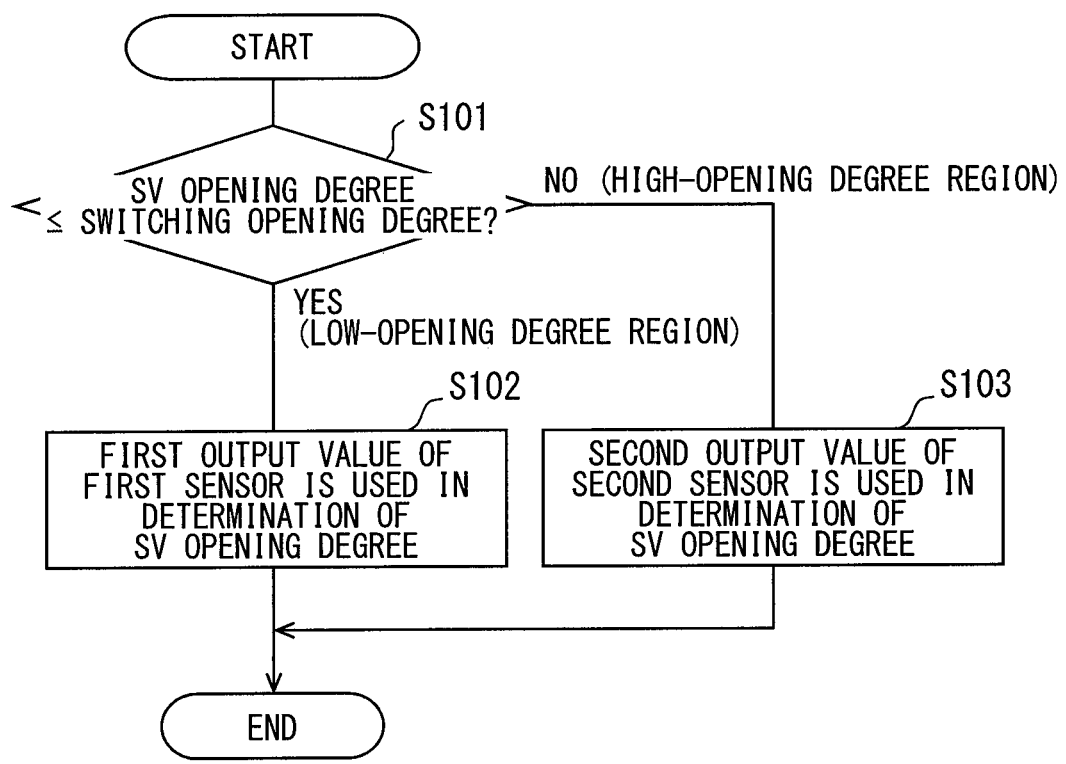
FIG. 4 is a flowchart showing details of a switching processing of a sensor executed by an angle determination unit.

The angle determination unit 80 that obtains the output values OV1 and OV2 from the magnetism detection unit 70 as the above description selects a sensor that uses an output value from plural sensors when determining the throttle valve opening degree. The angle determination unit 80 sets a switching opening degree CO to substantially be in the middle of a range where the first low-opening degree region LO1 and the second high-opening degree region HO2 overlap each other. At the switching opening degree CO, a selection sensor that is the sensor using the output value is switched between the first sensor 71 and the second sensor 72. Next, a switching processing executed by the angle determination unit 80 to switch the selection sensor will be detailed based on FIG. 4 by referring to FIGS. 2 and 3.

In addition, the switching processing starts in response to an activation of the engine control device 190, and is repeatedly executed at a predetermined cycle until an activation of the internal combustion engine is completed. Further, an opening degree region in the movable range RM of the throttle valve 30 (refer to FIG. 1) which has the throttle valve opening degree lower than the switching opening degree CO is referred to as a low-opening degree region LO, and an opening degree region in the movable range RM which has the throttle valve opening degree higher than the switching opening degree CO is referred to as a high-opening degree region HO.

At S101, the angle determination unit 80 compares the throttle valve opening degree and the switching opening degree CO. When the angle determination unit 80 determines that the throttle valve opening degree is lower than or equal to the switching opening degree CO at S101, that is, when the low-opening degree region LO is determined, the angle determination unit 80 proceeds to S102. At S102, the angle determination unit 80 sets the selection sensor to the first sensor 71, and determines the throttle valve opening degree by using the first output value OV1 obtained by the first sensor 71.

When the angle determination unit 80 determines that the throttle valve opening degree is higher than the switching opening degree CO at S101, that is, when the high-opening degree region HO is determined, the angle determination unit 80 proceeds to S103. At S103, the angle determination unit 80 sets the selection sensor to the second sensor 72, and determines the throttle valve opening degree by using the second output value OV2 obtained by the second sensor 72.

Figure 5:
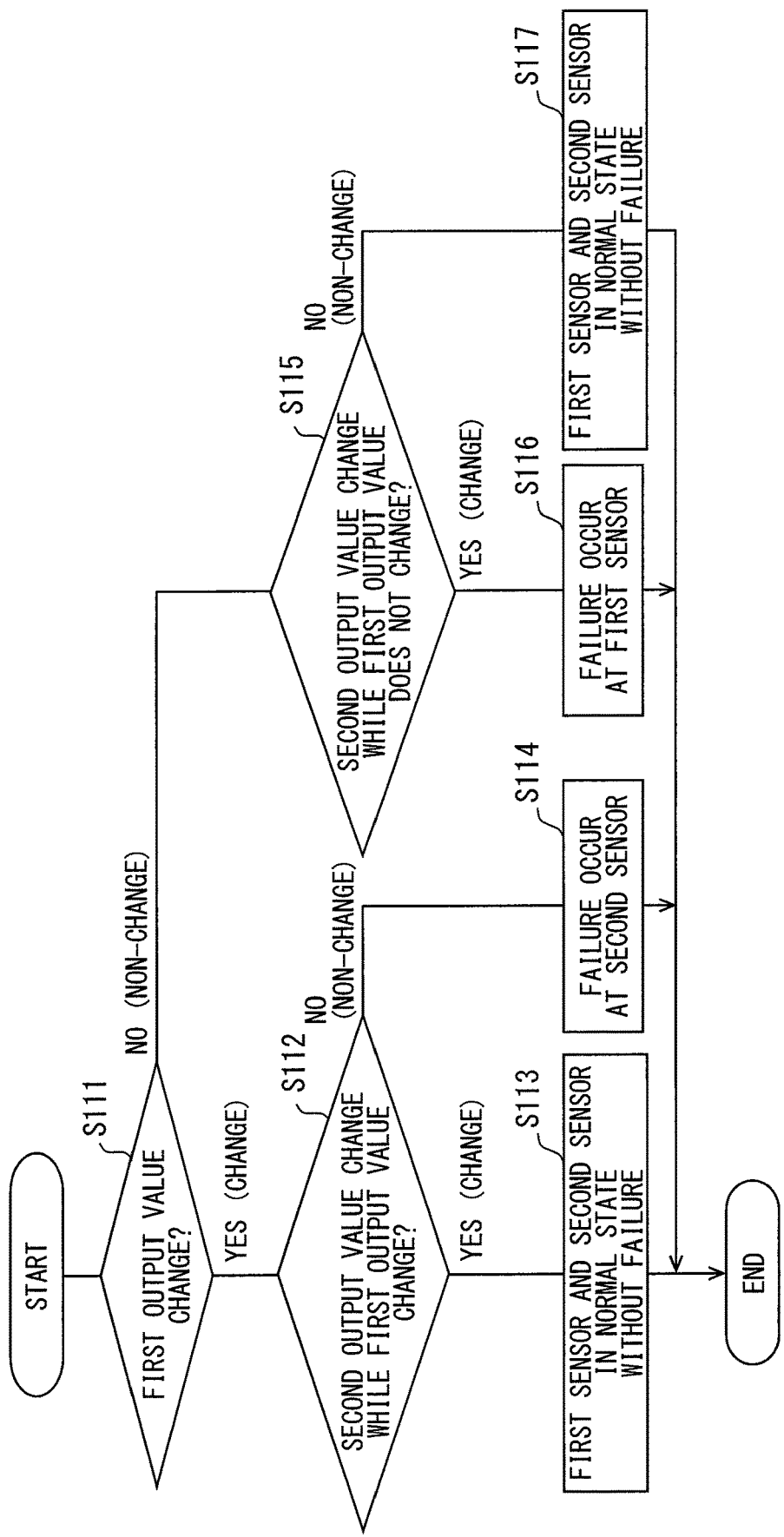
FIG. 5 is a flowchart showing details of a failure detection processing of the sensor executed by the angle determination unit.

Next, a failure detection processing executed by the angle determination unit 80 to detect the failure of the first sensor 71 and the second sensor 72 will be detailed based on FIG. 5 by referring to FIGS. 2 and 3, according to a comparison between the first output value OV1 and the second output value OV2. Similar to the switching processing, the failure detection processing starts in response to the activation of the engine control device 190, and is repeatedly executed at a predetermined cycle until the activation of the internal combustion engine is completed.

At S111, the angle determination unit 80 determines whether the first output value OV1 changes. When the angle determination unit 80 detects the change of the first output value OV1 at S111, the angle determination unit 80 proceeds to S112. At S112, the angle determination unit 80 determines whether the second output value OV2 changes while the first output value OV1 changes. When the angle determination unit 80 determines that both the first output value OV1 and the second output value OV2 change at S112, the angle determination unit 80 proceeds to S113. At S113, the angle determination unit 80 determines that both the first sensor 71 and the second sensor 72 are in a normal state without failure, and then terminates the present processing.

When the angle determination unit 80 determines that the second output value OV2 does not change while the first output value OV1 changes at S112, the angle determination unit 80 proceeds to S114. At S114, the angle determination unit 80 determines that the failure occurs at the second sensor 72, and then terminates the present processing.

When the angle determination unit 80 determines the first output value OV1 does not change at S111, angle determination unit 80 proceeds to S115. At S115, the angle determination unit 80 determines whether the second output value OV2 changes while the first output value OV1 does not change. When the angle determination unit 80 determines that the second output value OV2 changes while the first output value OV1 does not change at S115, the angle determination unit 80 proceeds to S116. At S116, the angle determination unit 80 determines that the failure occurs at the first sensor 71, and then terminates the present processing.

When the angle determination unit 80 determines that both the first output value OV1 and the second output value OV2 do not change at S115, the angle determination unit 80 proceeds to S117. At S117, the angle determination unit 80 determines that both the first sensor 71 and the second sensor 72 are in the normal state without failure, and then terminates the present processing.

The first sensor 71 and the second sensor 72 of the first embodiment as the above description constantly cause the output values OV1 and OV2 to change in response to the change of the throttle valve opening degree in the movable range RM of the throttle valve 30. Thus, the angle determination unit 80 may determine that the failure occurs at one of the first sensor 71 and the second sensor 72, based on that only one of the output values OV1 and OV2 corresponding to the one of the first sensor 71 and the second sensor 72 does not change in the entire region of the movable range RM.

In addition, in the first sensor 71 and the second sensor 72, change quantities of the output values relative to the predetermined change of the opening degree are set to be greater than those of opening degree regions of the movable range RM other than the first low-opening degree region LO1 and the second high-opening degree region HO2. Further, the second high-opening degree region HO2 is defined to include an opening degree region of the movable range RM different from the first low-opening degree region LO1. Thus, the throttle opening degree, that is, the rotation angle of the throttle valve 30 can be detected with a high precision, in a wide opening degree region of the movable range RM.

As the above description, the angle detection mechanism 20 where the first sensor 71 and the second sensor 72 that have different output characteristics and are combined can execute a failure detection in the entire region of the movable range RM and can enlarge a range to execute an angle detection with a high precision.

In addition, according to the first embodiment, when the throttle valve opening degree changes in a high-opening degree direction in the movable range RM, the first sensor 71 causes the first output value OV1 to increase only and the second sensor 72 causes the second output value OV2 to decrease only. As the above description, since the output values OV1 and OV2 are set to be monotonously increased or monotonously decreased, the throttle valve opening degrees corresponding to the output values OV1 and OV2 that are specific can be obtained as one value. Thus, an erroneous determination when the throttle valve opening degree is calculated from the output values OV1 and OV2 that are specific does not substantially occur.

Further, according to the first embodiment, it is set that the high-opening degree side of the first low-opening degree region LO1 overlaps the low-opening degree side of the second high-opening degree region HO2. Thus, when ranges of the first sensor 71 and the second sensor 72 where the detection of the throttle valve opening degree can be executed by a high resolution are set to be successive to each other, the angle determination unit 80 can execute the detection of the throttle valve opening degree with a high precision in a wide opening degree region.

Further, according to the first embodiment, since the angle detection mechanism 20 is applied to the electronic control throttle device 10, the detection of the throttle valve opening degree is achieved in the vicinity of the fully open position and the fully closed position with a high precision. Thus, when a control target of the throttle valve opening degree is set to the fully open position, the engine control device 190 can cause the throttle-valve main body 32 to accurately open to the fully open position and can minimize an intake pressure loss. As the above description, an output deterioration of the internal combustion engine generated due to an increasing of the intake pressure loss can be prevented.

In addition, according to the first embodiment, the throttle passage unit 14 is equivalent to a passage, the throttle valve 30 is equivalent to a rotation body, and the throttle-valve main body 32 is equivalent to a valve body. Further, the first sensor 71 is equivalent to a first detection unit, the second sensor 72 is equivalent to a second detection unit, and a selection sensor is equivalent to a selection detection unit. Furthermore, the first low-opening degree region LO1 is equivalent to a first rotation region, and the first high-opening degree region HO1 is equivalent to a rotation region other than the first rotation region. Moreover, the second high-opening degree region HO2 is equivalent to a second rotation region, the second low-opening degree region LO2 is equivalent to a rotation region other than the second rotation region, and the movable range RM is equivalent to the specific rotation range.

Second Embodiment

Figure 6:
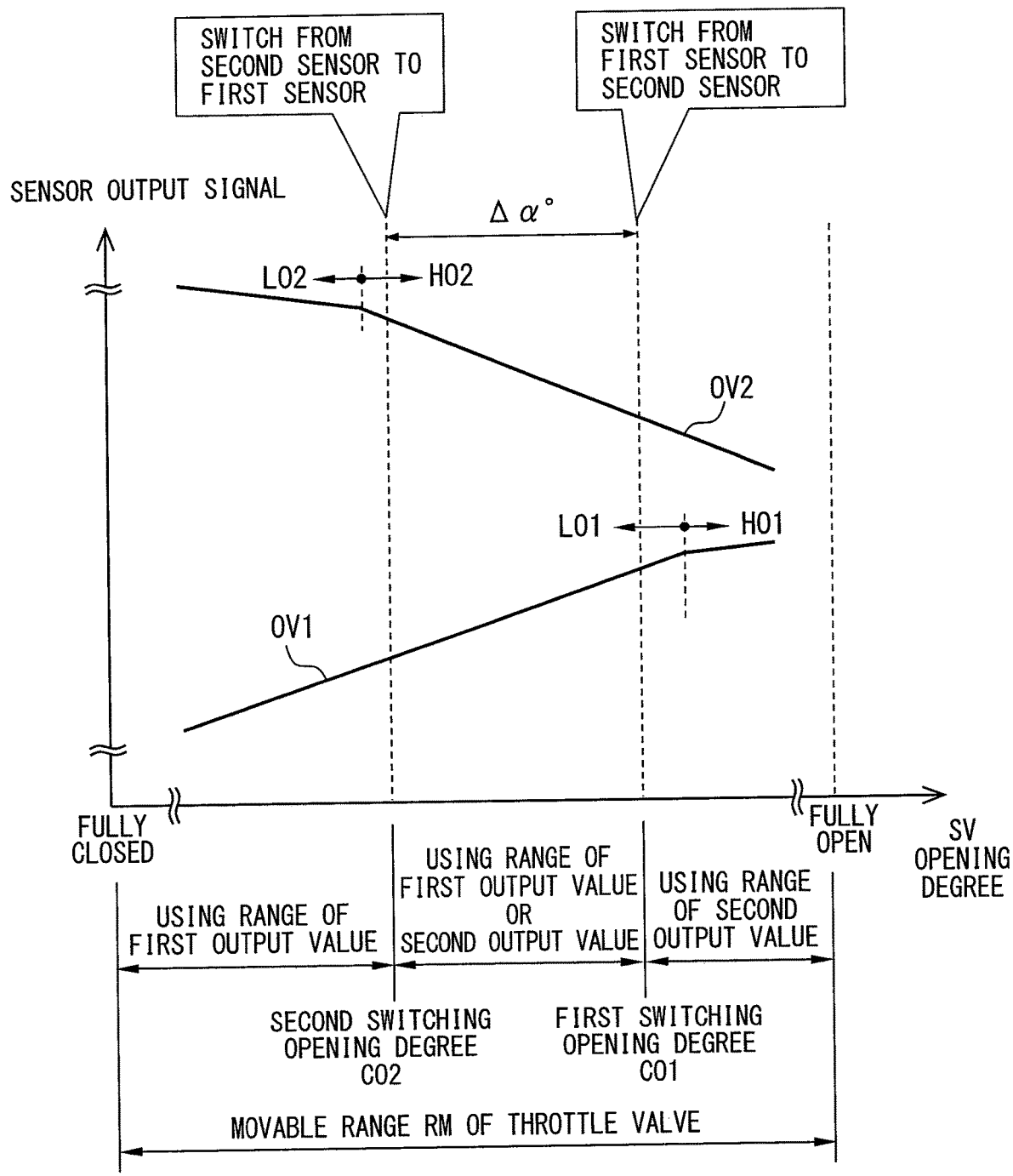
FIG. 6 is a graph showing the correlation of the throttle valve opening degree and the output value of each sensor, according to a second embodiment of the present disclosure.
Figure 7:
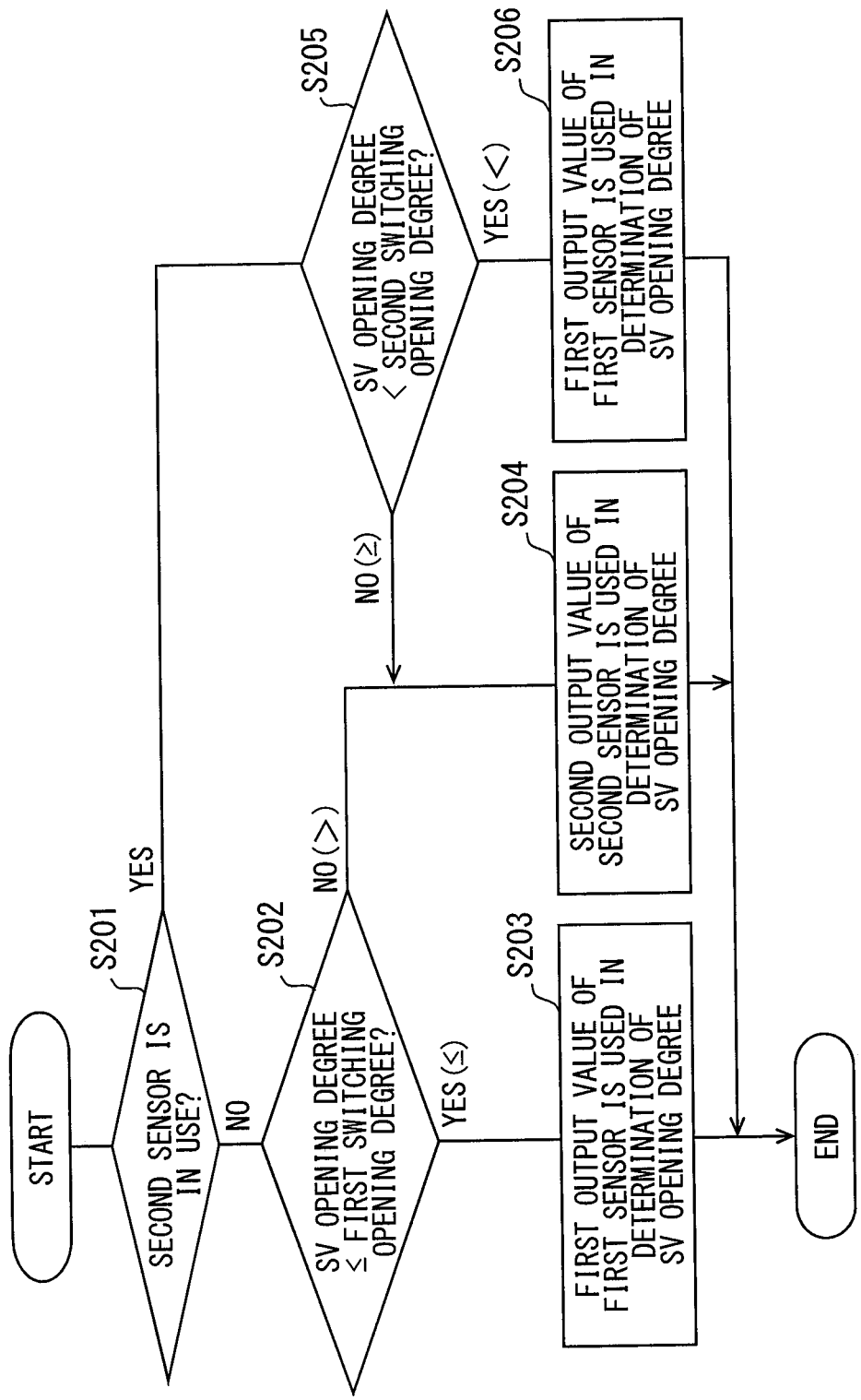
FIG. 7 is a flowchart showing details of the failure detection processing, according to a third embodiment of the present disclosure.
Figure 8:
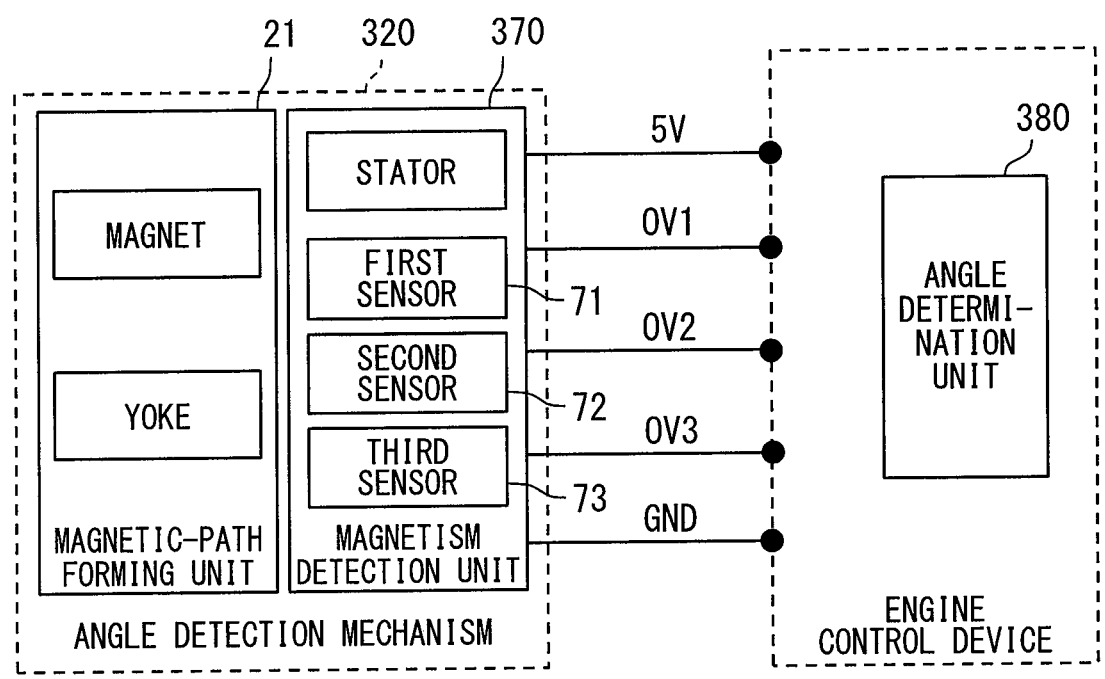
FIG. 8 is a block diagram showing the outline of the angle detection system, according to the third embodiment.

A second embodiment shown in FIGS. 6 and 7 is a modification example of the first embodiment. According to the second embodiment, modes of correlations between the throttle valve opening degree and output values OV1 and OV2 show in FIG. 6, that is, setting specifications of the gain adjustments of the sensors 71 and 72 (refer to FIG. 2), are different from those in the first embodiment. In addition, a hysteresis (refer to Δα° in FIG. 6) is defined in a switching of the selection sensor in the angle determination unit 80 (refer to FIG. 2). Next, the second embodiment will be detailed based on FIGS. 6 and 7 by referring to FIGS. 1 and 2.

The first sensor 71 causes to the first output value OV1 to monotonically increase in response to an increase of the throttle valve opening degree in the entire region of the movable range RM of the throttle valve 30. At the first sensor 71, the first low-opening degree region LO1 and the first high-opening degree region HO1 are set. The change quantity of the first output value OV1 relative to the predetermined change of the throttle valve opening degree in the first low-opening degree region LO1 is set to be greater than that in the first high-opening degree region HO1.

The second sensor 72 causes to the second output value OV2 to monotonically decrease in response to the increase of the throttle valve opening degree in the entire region of the movable range RM of the throttle valve 30. At the second sensor 72, the second low-opening degree region LO2 and the second high-opening degree region HO2 are set. The change quantity of the second output value OV2 relative to the predetermined change of the throttle valve opening degree in the second high-opening degree region HO2 is set to be greater than that in the second low-opening degree region LO2. It is set that a part of the low-opening degree side of the second high-opening degree region HO2 overlaps a part of the high-opening degree side of the first low-opening degree region LO1. Thus, ranges of the first sensor 71 and the second sensor 72 where the detection can be executed by a high resolution overlap each other.

The angle determination unit 80 sets a first switching opening degree CO1 and a second switching opening degree CO2 which switch the selection sensor between the first sensor 71 and the second sensor 72, in a range where the first low-opening degree region LO1 overlaps the second high-opening degree region HO2. The first switching opening degree CO1 is set in a specific rotation direction, which is direction (high-opening degree side) where the throttle valve opening degree is greater than that of the second switching opening degree CO2. When the throttle valve opening degree becomes greater in response to the rotation of the throttle valve 30 in the specific rotation direction, the angle determination unit 80 switches the selection sensor from the first sensor 71 to the second sensor 72 at the first switching opening degree CO1. When the throttle valve opening degree becomes smaller in response to the rotation of the throttle valve 30 in a direction opposite to the specific rotation direction, the angle determination unit 80 switches the selection sensor from the second sensor 72 to the first sensor 71 at the second switching opening degree CO2. The switching processing according to the second embodiment where the hysteresis is provided will be detailed based on FIG. 7 by referring to FIGS. 2 and 6.

At S201, the angle determination unit 80 determines whether the second output value OV2 of the second sensor 72 is used in a determination of the throttle valve opening degree. When the angle determination unit 80 determines that the first output value OV1 is used in the determination of the throttle valve opening degree at S201, the angle determination unit 80 proceeds to S202. At S202, the angle determination unit 80 compares the throttle valve opening degree and the first switching opening degree CO1. When the throttle valve opening degree is less than or equal to the first switching opening degree CO1, the angle determination unit 80 proceeds to S203. At S203, the angle determination unit 80 sets the selection sensor to the first sensor 71, and then terminates the present processing. As the above description, a state where the first output value OV1 is used in the determination of the throttle valve opening degree is continued.

When the angle determination unit 80 determines that the throttle valve opening degree is greater than the first switching opening degree CO1 at S202, the angle determination unit 80 proceeds to S204. At S204, the angle determination unit 80 set the selection sensor to the second sensor 72, and then terminates the present processing. As the above description, it is switched to a state where the second output value OV2 is used in the determination of the throttle valve opening degree.

When the angle determination unit 80 determines that the second output value OV2 is used in the determination of the throttle valve opening degree at S201, the angle determination unit 80 proceeds to S205. At S205, the angle determination unit 80 compares the throttle valve opening degree and the second switching opening degree CO2. When the angle determination unit 80 determines that the throttle valve opening degree is greater than or equal to the second switching opening degree CO2 at S205, the angle determination unit 80 proceeds to S204. Then, the state where the second output value OV2 is used in the determination of the throttle valve opening degree is continued.

When the angle determination unit 80 determines that the throttle valve opening degree is less than the second switching opening degree CO2 at S205, the angle determination unit 80 proceeds to S206. At S206, the angle determination unit 80 sets the selection sensor to the first sensor 71, and then terminates the present processing. As the above description, it is switched to the state where the first output value OV1 is used in the determination of the throttle valve opening degree.

The second embodiment as the above description obtains effects the same as effects of the first embodiment, and the failure detection can be executed in the entire region of the movable range RM while the range where the angle detection is executed with a high precision is enlarged. Further, in the second embodiment, the hysteresis is provided in the switching of the selection sensor, by settings of the first switching opening degree CO1 and the second switching opening degree CO2 that are different from each other. Thus, it is prevented that a hunting occurs in the switching between the first sensor 71 and the second sensor 72 due to a variation of the throttle valve opening degree. In addition, according to the second embodiment, the first switching opening degree CO1 is equivalent to a first switching angle, and the second switching opening degree CO2 is equivalent to a second switching angle.

Third Embodiment

A third embodiment shown in FIGS. 8 to 11 is another modification example of the first embodiment. An angle detection mechanism 320 according to the third embodiment includes the magnetic-path forming unit 21 that is substantially the same as the magnetic-path forming unit 21 of the first embodiment, and a magnetism detection unit 370. The magnetism detection unit 370 is provided with the first sensor 71 and the second sensor 72 which are substantially the same as the first sensor 71 and the second sensor 72 of the first embodiment, and a third sensor 73. The magnetism detection unit 370 detects the rotation angle of the throttle valve 30 (refer to FIG. 1), by using three sensors 71, 72 and 73. Next, setting specifications of gain adjustments of the sensors 71, 72 and 73 will be described.

Figure 9:
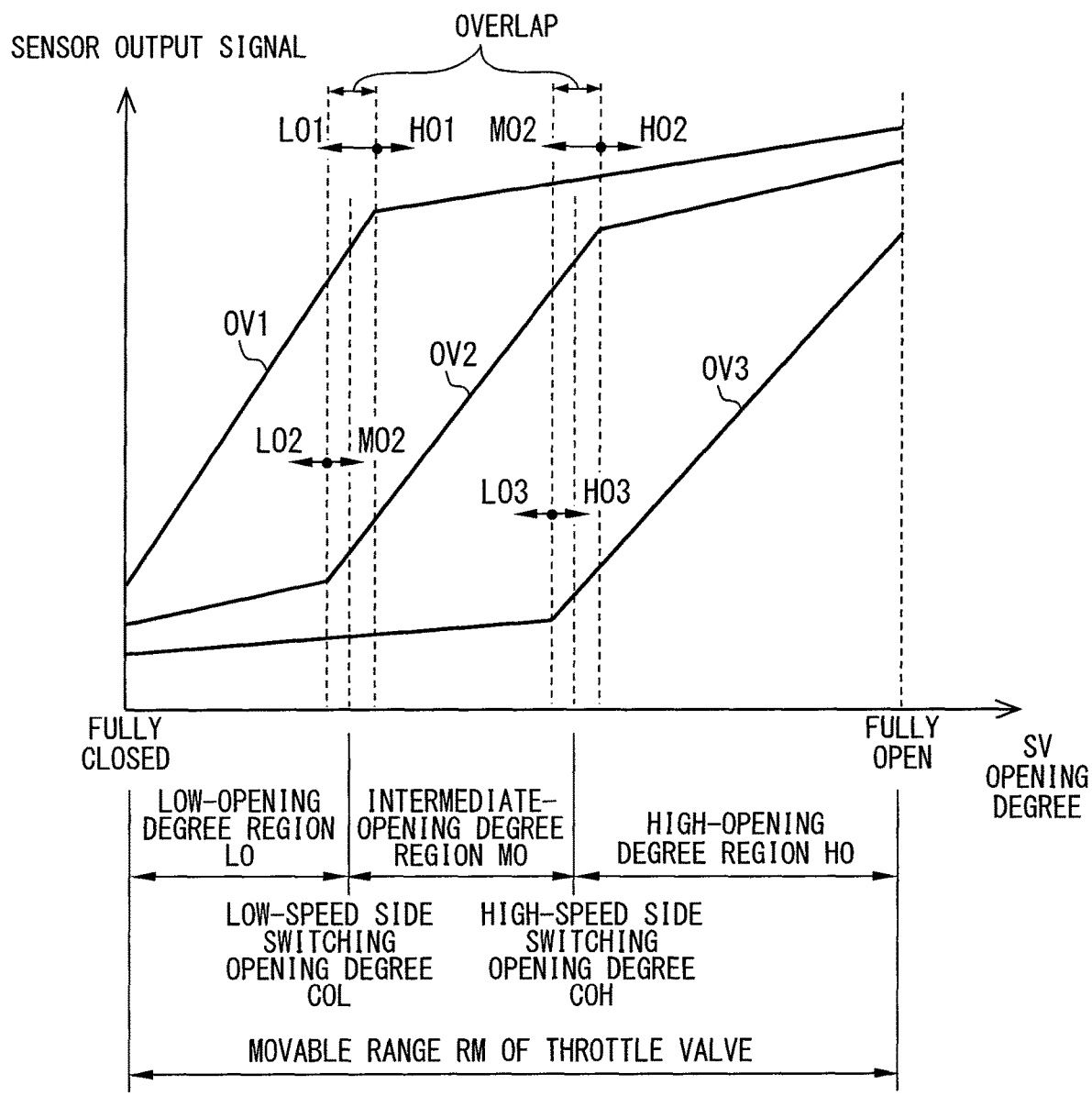
FIG. 9 is a graph showing the correlation of the throttle valve opening degree and the output value of each sensor, according to the third embodiment.
Figure 10:
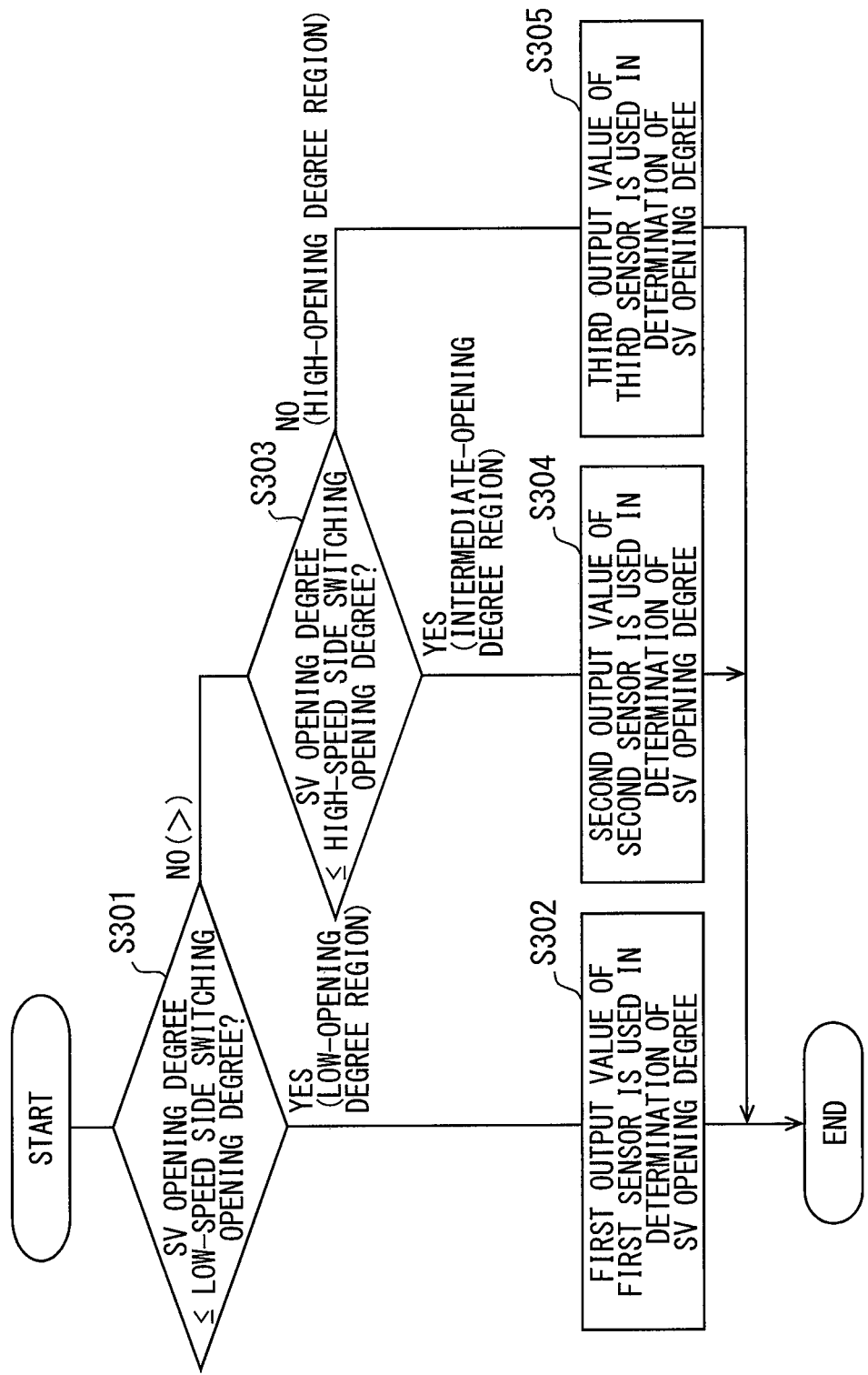
FIG. 10 is a flowchart showing details of the switching processing, according to the third embodiment.

At the first sensor 71, the first low-opening degree region LO1 and the first high-opening degree region HO1 are set (particularly refer to FIG. 9). The change quantity of the first output value OV1 relative to the predetermined change of the throttle valve opening degree in the first low-opening degree region LO1 is set to be greater than that in the first high-opening degree region HO1.

Similar to the first sensor 71, the second sensor 72 causes to the second output value OV2 to monotonically increase in response to the increase of the throttle valve opening degree in the entire region of the movable range RM. At the second sensor 72, the second low-opening degree region LO2, a second intermediate-opening degree region MO2 and the second high-opening degree region HO2 are set. The change quantity of the second output value OV2 relative to the predetermined change of the throttle valve opening degree in the second intermediate-opening degree region MO2 is set to be greater than that in the second low-opening degree region LO2 and in the second high-opening degree region HO2. It is set that a part of a low-opening degree side of the second intermediate-opening degree region MO2 overlaps a part of the high-opening degree side of the first low-opening degree region LO1. Thus, ranges of the first sensor 71 and the second sensor 72 where the detection can be executed by a high resolution overlap each other.

The third sensor 73 is a Hall IC that is substantially the same as the first sensor 71 and the second sensor 72. Similar to the first output value OV1 and the second output value OV2, a third output value OV3 output by the third sensor 73 constantly changes in response to the angle change of the throttle valve 30 in the entire region of the movable range RM of the throttle valve 30 (refer to FIG. 1). The third sensor 73 causes the third output value OV3 to monotonically increase in response to the increase of the throttle valve opening degree. At the third sensor 73, a third low-opening degree region LO3 and a third high-opening degree region HO3 are set.

The third high-opening degree region HO3 is an opening degree region in the movable range RM different from both the first low-opening degree region LO1 and the second intermediate-opening degree region MO2, and is defined to include an opening degree region at a high-opening degree side of the opening degree regions LO1 and MO2. A change quantity of the third output value OV3 relative to the predetermined change of the throttle valve opening degree in the third high-opening degree region HO3 is set to be greater than that in the third low-opening degree region LO3. It is set that a part of a low-opening degree side of the third high-opening degree region HO3 overlaps a part of a high-opening degree side of the second intermediate-opening degree region MO2. Thus, the ranges of the second sensor 72 and the third sensor 73 where the detection can be executed by a high resolution overlap each other.

The angle determination unit 380 that obtains the output values OV1, OV2 and OV3 from the magnetism detection unit 370 as the above description sets a low-speed side switching opening degree COL and a high-speed side switching opening degree COH. The low-speed side switching opening degree COL is set approximately at the middle of a range where the first low-opening degree region LO1 overlaps the second intermediate-opening degree region MO2. At the low-speed side switching opening degree COL, the second sensor is switched between the first sensor 71 and the second sensor 72. The high-speed side switching opening degree COH is set approximately at the middle of a range where the second intermediate-opening degree region MO2 overlaps the third high-opening degree region HO3. At the high-speed side switching opening degree COH, the second sensor is switched between the second sensor 72 and the third sensor 73. Next, a switching processing executed by the angle determination unit 380 to switch the selection sensor will be detailed (refer to FIG. 10).

In addition, in following description, an opening degree region in the movable range RM where the throttle valve opening degree is lower than that of the low-speed side switching opening degree COL is referred to as a low-opening degree region LO, and an opening degree in the movable range RM between the low-speed side switching opening degree COL and the high-speed side switching opening degree COH is referred to as an intermediate-opening degree region MO. Further, an opening degree region in the movable range RM where the throttle valve opening degree is higher than that of the high-speed side switching opening degree COH is referred to as a high-opening degree region HO.

At S301, the angle determination unit 380 compares the throttle valve opening degree and the low-speed side switching opening degree COL. When the throttle valve opening degree is less than or equal to the low-speed side switching opening degree COL, the angle determination unit 380 proceeds to S302. At S302, the angle determination unit 380 sets the selection sensor to the first sensor 71, and then terminates the present processing. As the above description, it is switched to the state where the first output value OV1 of the first sensor 71 is used in the determination of the throttle valve opening degree.

When the angle determination unit 380 determines that the throttle valve opening degree is greater than the low-speed side switching opening degree COL at S301, the angle determination unit 380 proceeds to S303. At S303, the angle determination unit 380 compares the throttle valve opening degree and the high-speed side switching opening degree COH. When the throttle valve opening degree is less than or equal to the high-speed side switching opening degree COH, the angle determination unit 380 proceeds to S304. At S304, the angle determination unit 380 sets the selection sensor to the second sensor 72, and then terminates the present processing. As the above description, it is switched to the state where the second output value OV2 of the second sensor 72 is used in the determination of the throttle valve opening degree.

When the angle determination unit 380 determines that the throttle valve opening degree is greater than the high-speed side switching opening degree COH at S303, the angle determination unit 380 proceeds to S305. At S305, the angle determination unit 380 sets the selection sensor to the third sensor 73, and then terminates the present processing. As the above description, it is switched to a state where the third output value OV3 of the third sensor 73 is used in the determination of the throttle valve opening degree.

Figure 11:
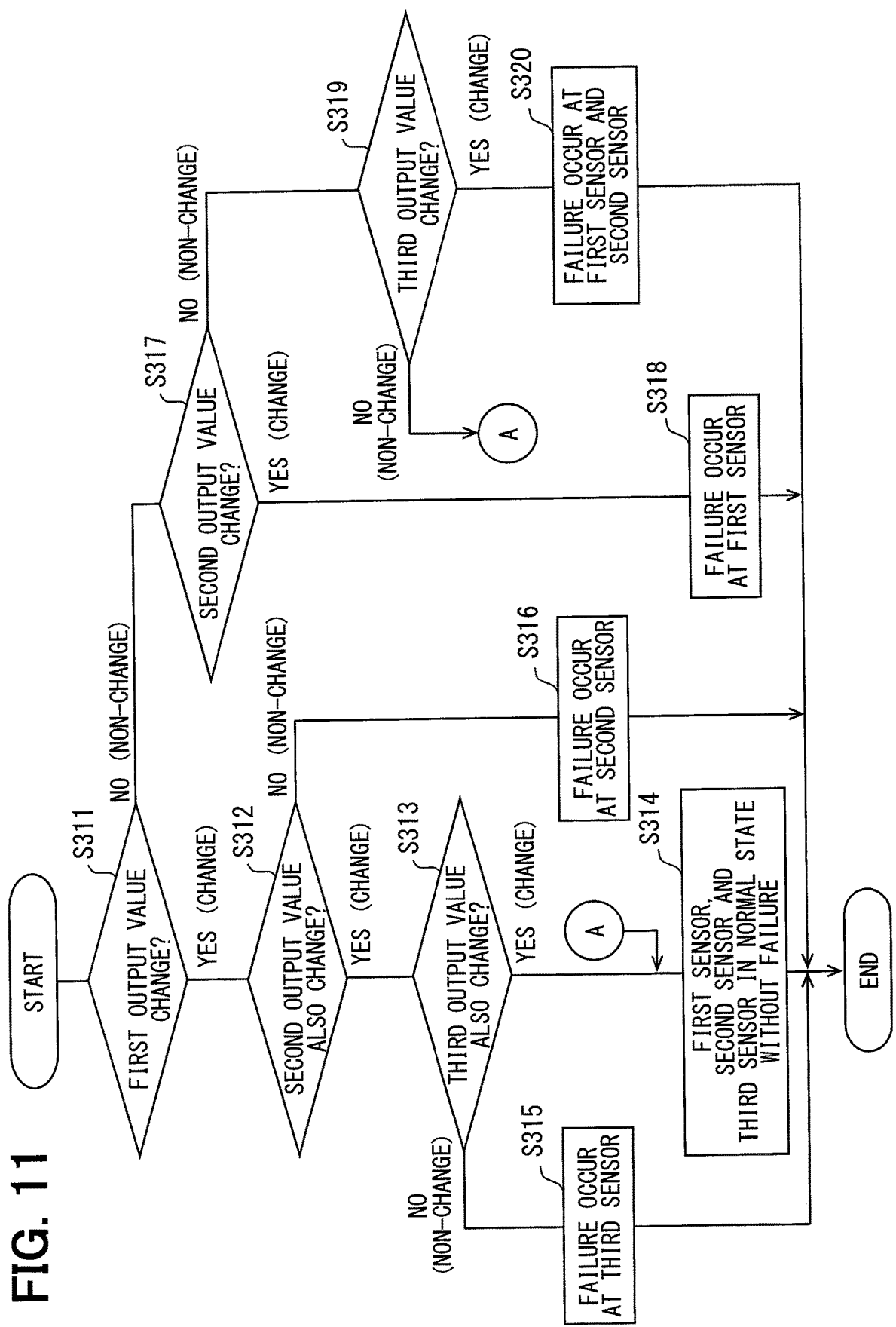
FIG. 11 is a flowchart showing details of the failure detection processing, according to the third embodiment.

Next, a failure detection processing in the third embodiment which is executed by the angle determination unit 380 to detect failure of the sensors 71, 72 and 73 by comparing three output values OV1, OV2 and OV3 will be detailed (refer to FIG. 11).

At S311, the angle determination unit 380 determines whether the first output value OV1 changes. When it is detected that the first output value OV1 changes, the angle determination unit 380 proceeds to S312. At S312, the angle determination unit 380 determines whether the second output value OV2 changes while the first output value OV1 changes. When the angle determination unit 380 determines that both the first output value OV1 and the second output value OV2 change at S312, the angle determination unit 380 proceeds to S313.

At S313, the angle determination unit 380 determines whether the third output value OV3 changes while both the first output value OV1 and the second output value OV2 change. When the angle determination unit 380 determines that the third output value OV3 does not change while both the first output value OV1 and the second output value OV2 change at S313, the angle determination unit 380 proceeds to S315. At S315, the angle determination unit 380 determines that the failure occurs at the third sensor 73, and then terminates the present processing. When the angle determination unit 380 determines all of the output values OV1, OV2 and OV3 change at S313, the angle determination unit 380 proceeds to S314. At S314, the angle determination unit 380 determines that three sensors 71, 72 and 73 are all in the normal state without failure, and then terminates the present processing.

When the angle determination unit 380 determines that the second output value OV2 does not change while the first output value OV1 changes at S312, the angle determination unit 380 proceeds to S316. At S316, the angle determination unit 380 determines that the failure occurs at the second sensor 72, and then terminates the present processing.

When the angle determination unit 380 determines that the first output value OV1 does not change at S311, the angle determination unit 380 proceeds to S317. At S317, the angle determination unit 380 determines whether the second output value OV2 changes while the first output value OV1 does not change. When the angle determination unit 380 determines that the second output value OV2 changes while the first output value OV1 does not change at S317, the angle determination unit 380 proceeds to S318. At S318, the angle determination unit 380 determines that the failure occurs at the first sensor 71, and then terminates the present processing.

When the angle determination unit 380 determines that both the first output value OV1 and the second output value OV2 do not change at S317, the angle determination unit 380 proceeds to S319. At S319, the angle determination unit 380 determines whether the third output value OV3 changes while both the first output value OV1 and the second output value OV2 do not change. When the angle determination unit 380 determines that all of the output values OV1, OV2 and OV3 do not change at S319, the angle determination unit 380 proceeds to S314. At S314, the angle determination unit 380 determines that three sensors 71, 72 and 73 are all in the normal state, and then terminates the present processing.

When the angle determination unit 380 determines that the third output value OV3 changes while both the first output value OV1 and the second output value OV2 do not change at S319, the angle determination unit 380 proceeds to S320. At S320, the angle determination unit 380 determines that the failure occurs at the first sensor 71 and the second sensor 72, and then terminates the present processing.

The third embodiment as the above description obtains effects the same as effects of the first embodiment, and the angle detection mechanism 320 can execute the failure detection in the entire region of the movable range RM and can enlarge the range where an opening degree determination is executed with a high precision. In addition, the magnetism detection unit 370 of the third embodiment includes the first sensor 71, the second sensor 72 and the third sensor 73. The third high-opening degree region HO3 where an opening degree detection is executed at the third sensor 73 with a high precision includes the first low-opening degree region LO1 and the second intermediate-opening degree region MO2 which are different from each other. As the above description, the angle detection mechanism 320 can execute the opening degree determination in a wide opening degree region with a high precision.

In addition, according to the third embodiment, the second intermediate-opening degree region MO2 is equivalent to the second rotation region, and the second low-opening degree region LO2 and the second high-opening degree region HO2 are equivalent to the rotation region other than the second rotation region. Further, the third sensor 73 is equivalent to a third detection unit, the third low-opening degree region LO3 is equivalent to a third rotation region, and the third high-opening degree region HO3 is equivalent to a rotation region other than the third rotation region.

Fourth Embodiment

Figure 12:
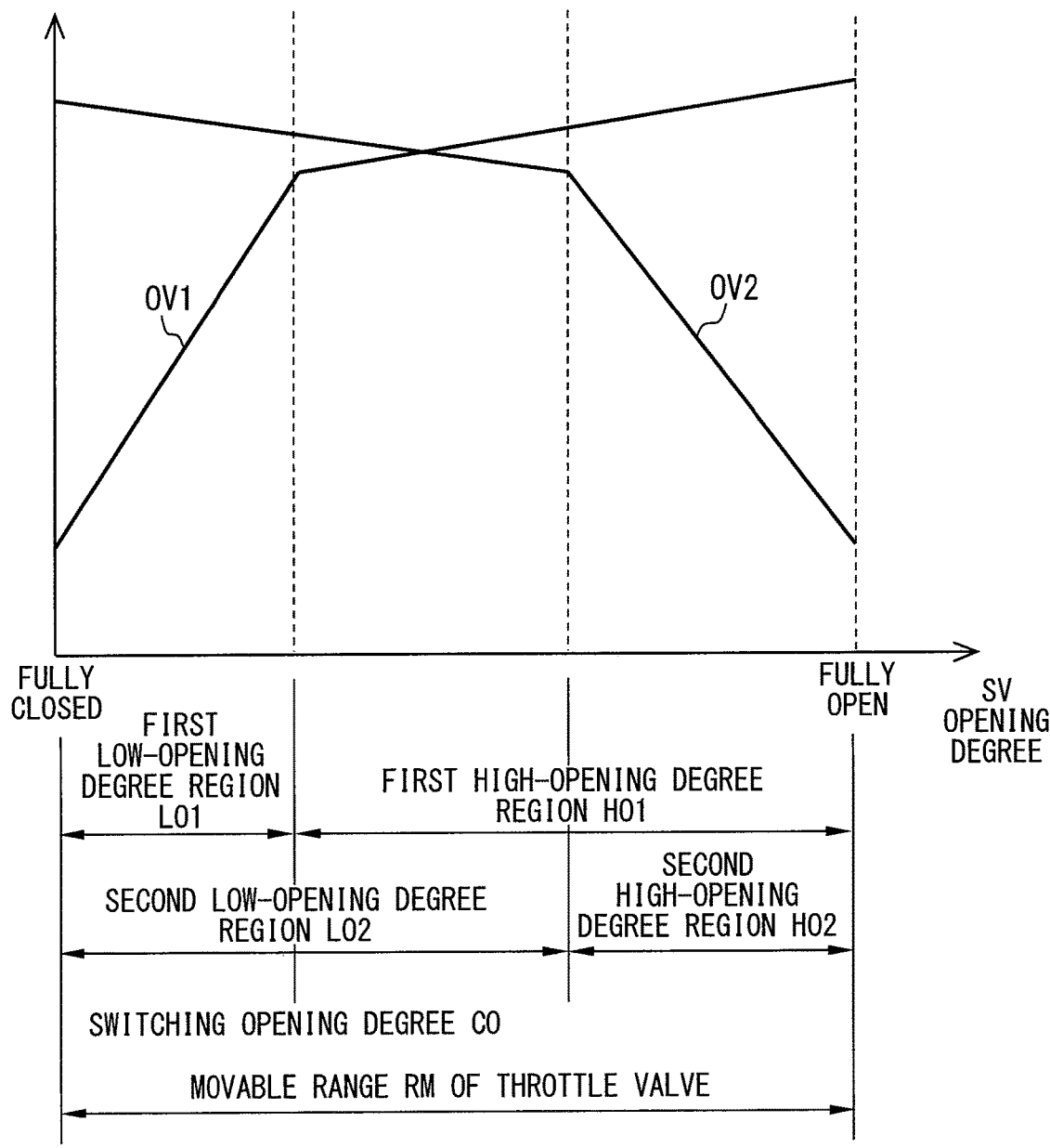
FIG. 12 is a graph showing the correlation of the throttle valve opening degree and the output value of each sensor, according to a fourth embodiment of the present disclosure.
Figure 13:
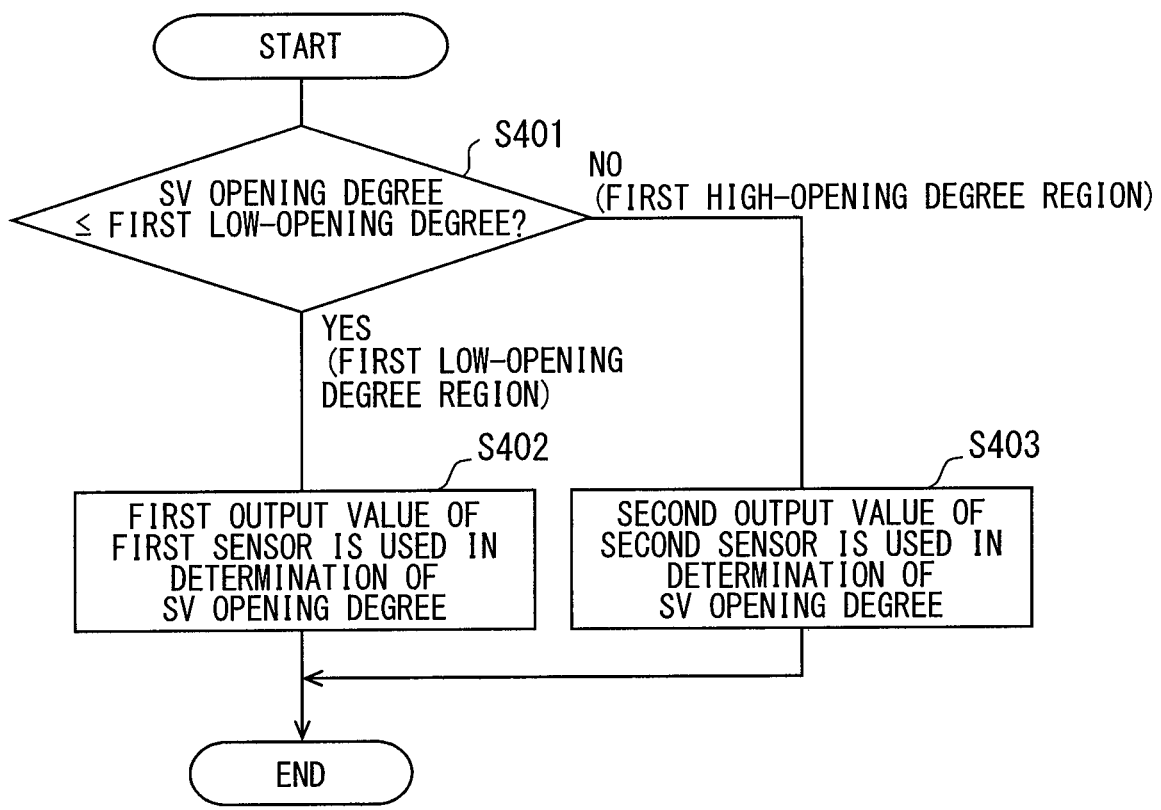
FIG. 13 is a flowchart showing details of the switching processing, according to the fourth embodiment.

A fourth embodiment shown in FIGS. 12 and 13 is another modification example of the first embodiment. According to the fourth embodiment, modes of correlation lines between the throttle valve opening degree, the first output value OV1 and the second output value OV2 are different from those in the first embodiment. Next, an angle detection mechanism according to the fourth embodiment will be detailed based on FIGS. 12 and 13 by referring to FIG. 2.

A boundary between the first low-opening degree region LO1 and the first high-opening degree region HO1 in the first sensor 71 is set to be at a low-opening degree side of a boundary between the second low-opening degree region LO2 and the second high-opening degree region HO2 in the second sensor 72. In other words, the first low-opening degree region LO1 in the first sensor 71 where the detection can be executed with a high precision does not overlap the second high-opening degree region HO2 in the second sensor 72 where the detection can be executed with a high precision. Thus, overlap is not set.

The angle determination unit 80 sets the switching opening degree CO to switch the selection sensor between the first sensor 71 and the second sensor 72, at the boundary between the first low-opening degree region LO1 and the first high-opening degree region HO1. A switching processing according to the fourth embodiment where the selection sensor is switched by the switching opening degree CO will be detailed as follows.

At S401, the angle determination unit 80 compares the throttle valve opening degree and the switching opening degree CO. When the angle determination unit 80 determines that the throttle valve opening degree is less than or equal to the switching opening degree CO, that is, when it is in the first low-opening degree region LO1 at S401, the angle determination unit 80 proceeds to S402. At S402, the angle determination unit 80 sets the selection sensor to the first sensor 71, and then terminates the present processing. When the angle determination unit 80 determines that the throttle valve opening degree is greater than the switching opening degree CO, that is, when it is in the second high-opening degree region HO2 at S401, the angle determination unit 80 proceeds to S403. At S403, the angle determination unit 80 sets the selection sensor to the second sensor 72, and then terminates the present processing.

According to the fourth embodiment as described above, even though the opening degree region where the detection can be executed with a high precision is set not to overlap the throttle valve opening degree, the angle detection mechanism can execute the failure detection in the entire region of the movable range RM and can execute the opening degree determination with a high precision in plural ranges.

Fifth Embodiment

Figure 14:
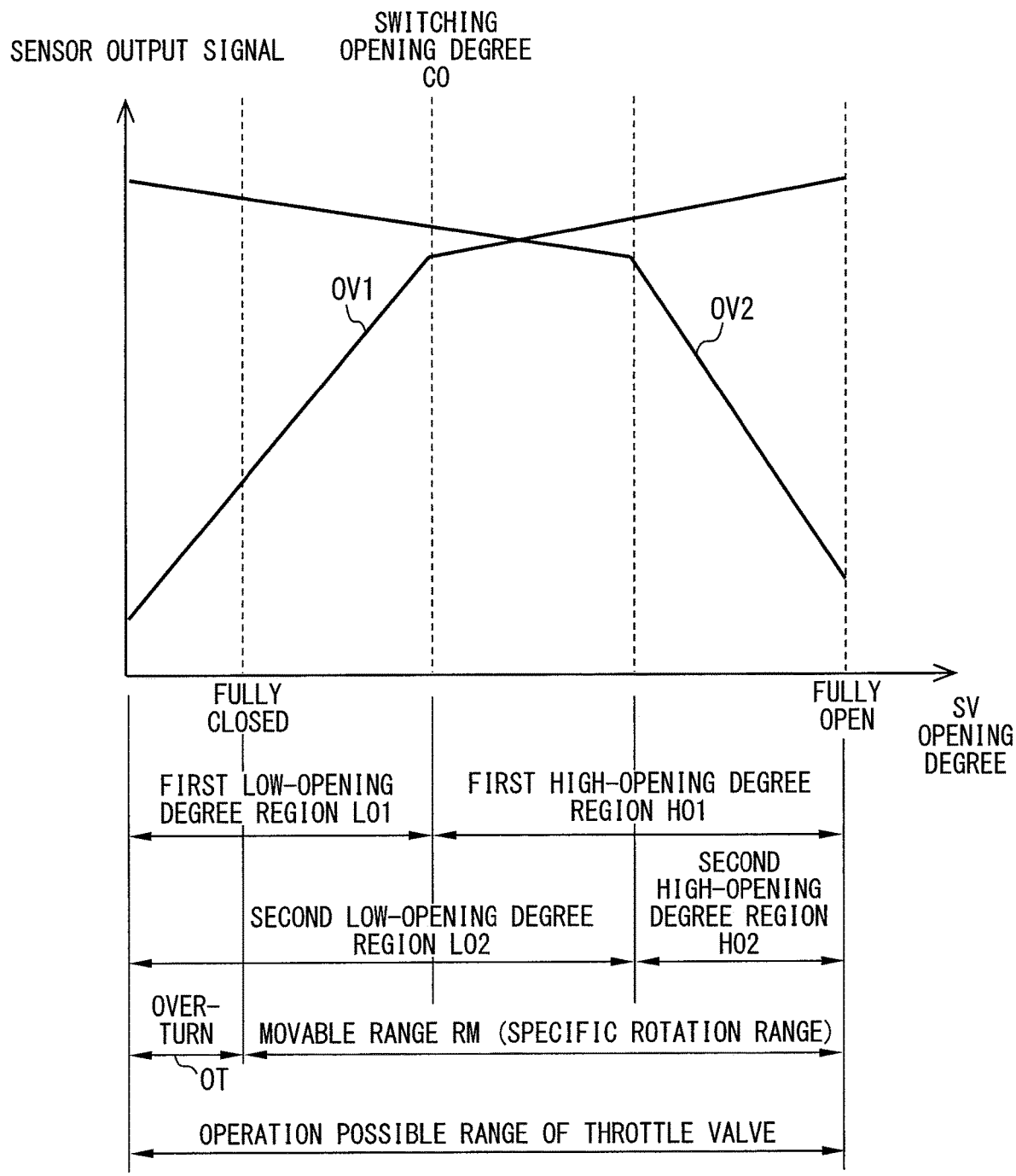
FIG. 14 is a graph showing the correlation of the throttle valve opening degree and the output value of each sensor, according to a fifth embodiment of the present disclosure.

A fifth embodiment shown in FIG. 14 is a modification example of the fourth embodiment. According to the fifth embodiment, an operation possible range of the throttle valve 30 shown in FIG. 1 includes the movable range RM from the fully closed position to the fully open position of the throttle-valve main body 32 and an overturn range OT where the throttle-valve main body 32 is caused to rotate in a direction opposite to a direction from the fully closed position to the fully open position. Next, the angle detection mechanism according to the fifth embodiment will be detailed based on FIG. 14 by referring to FIG. 1.

In the overturn range OT different from the movable range RM that is normal, the first sensor 71 and the second sensor 72 can constantly cause the output values OV1 and OV2 to change in response to the angle change of the throttle valve 30. In other words, the overturn range OT is included in the first low-opening degree region LO1 and the second low-opening degree region LO2.

Specifically, the first sensor 71 causes the first output value OV1 to monotonically increase in response to an approach of the throttle valve opening degree toward the fully closed position, in the first low-opening degree region LO1 including the overturn range OT. The second sensor 72 causes the second output value OV2 to monotonically decrease in response to the approach of the throttle valve opening degree toward the fully closed position, in the second low-opening degree region LO2 including the overturn range OT.

According to the fifth embodiment as the above description, each of the low-opening degree regions LO1 and LO2 where each of the output values OV1 and OV2 constantly changes is defined to include the overturn range OT that exceeds the fully closed position. Thus, when the operation possible range of the throttle valve 30 is applied to the electronic control throttle device 10 including the overturn range OT, the angle detection mechanism can execute the opening degree detection with a high precision in the overturn range OT and can certainly detect the failure of each of the sensors 71 and 72. In addition, according to the fifth embodiment, the overturn range OT is equivalent to an out-range region that is different from the specific rotation range.

Sixth Embodiment

Figure 15:
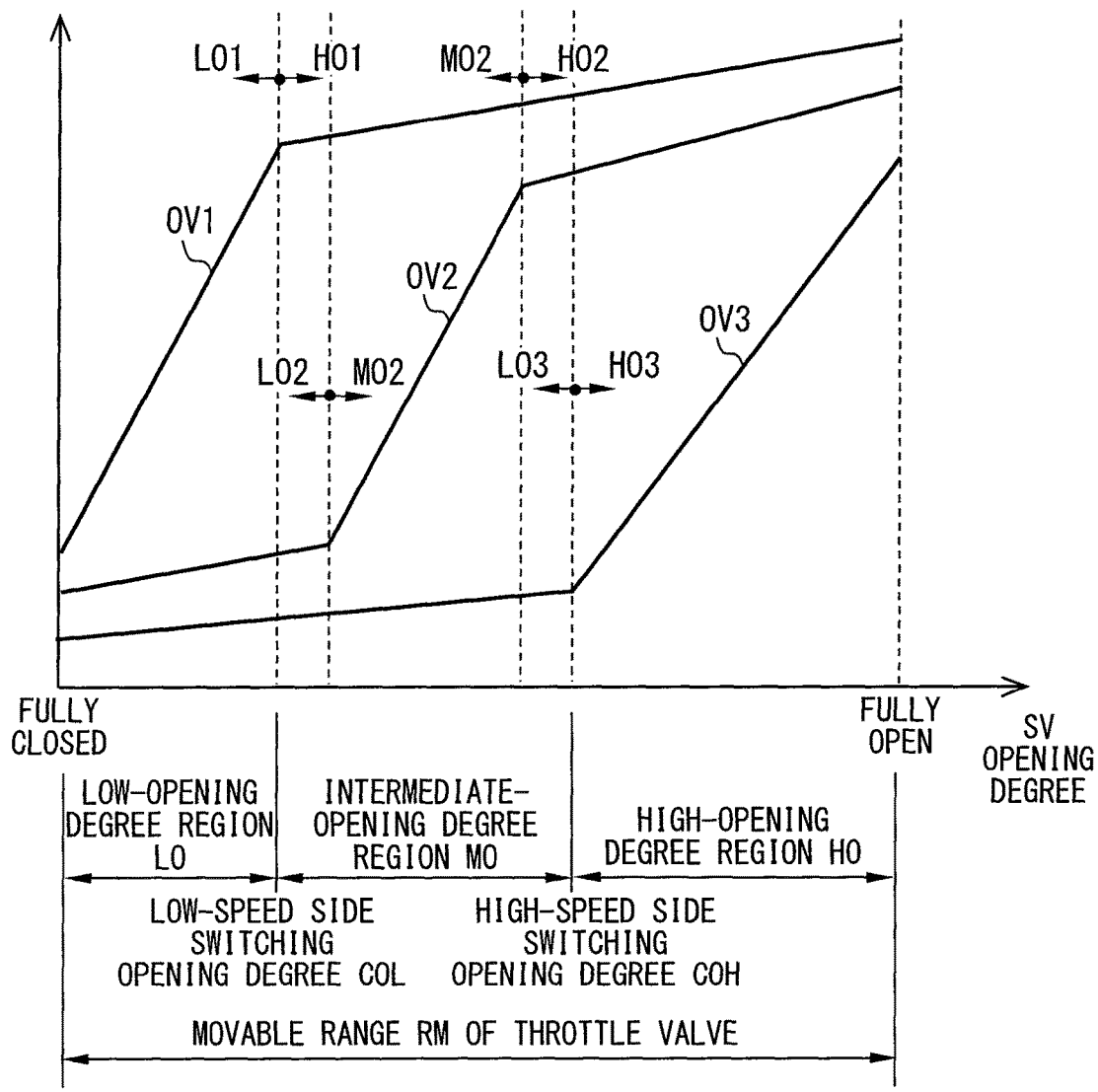
FIG. 15 is a graph showing the correlation of the throttle valve opening degree and the output value of each sensor, according to a sixth embodiment of the present disclosure.

A sixth embodiment shown in FIG. 15 is a modification example of the third embodiment. According to the sixth embodiment, a setting of each gain adjustment of each of the sensors 71, 72 and 73 is different from that of the third embodiment (refer to FIG. 8). Specifically, a boundary between the first low-opening degree region LO1 and the first high-opening degree region HO1 in the first sensor 71 is set to be at a low-opening degree side of a boundary between the second low-opening degree region LO2 and the second intermediate-opening degree region MO2 in the second sensor 72. Further, a boundary between the third low-opening degree region LO3 and the third high-opening degree region HO3 in the third sensor 73 is set to be at a high-opening degree side of a boundary between the second intermediate-opening degree region MO2 and the second high-opening degree region HO2 in the second sensor 72. As the above description, the ranges where the detection can be executed by a high resolution at each of the sensors 71, 72 and 73 does not overlap.

The angle determination unit 380 (refer to FIG. 8) sets the low-speed side switching opening degree COL to switch the selection sensor to between the first sensor 71 and the second sensor 72, at the boundary between the first low-opening degree region LO1 and the first high-opening degree region HO1. The angle determination unit 380 sets the high-speed side switching opening degree COH to switch the selection sensor between the second sensor 72 and the third sensor 73, at the boundary between the third low-opening degree region LO3 and the third high-opening degree region HO3.

As the above description, an opening degree region in the movable range RM where the throttle valve opening degree is lower than that of the low-speed side switching opening degree COL is referred to as the low-opening degree region LO. At the low-opening degree region LO, the first output value OV1 is used in the determination of the throttle valve opening degree. An opening degree region between the low-speed side switching opening degree COL and the high-speed side switching opening degree COH is referred to as the intermediate-opening degree region MO. At the intermediate-opening degree region MO, the second output value OV2 is used in the determination of the throttle valve opening degree. An opening degree region in the movable range RM where the throttle valve opening degree is higher than that of the high-speed side switching opening degree COH is referred to as the high-opening degree region HO. At the high-opening degree region HO, the third output value OV3 is used in the determination of the throttle valve opening degree.

According to the sixth embodiment as the above description, in the angle detection mechanism using three sensors 71, 72 and 73, even though overlap is not provided, the failure detection can be executed in the entire region of the movable range RM and the opening degree determination can be achieved with a high precision in plural ranges.

Seventh Embodiment

Figure 16:
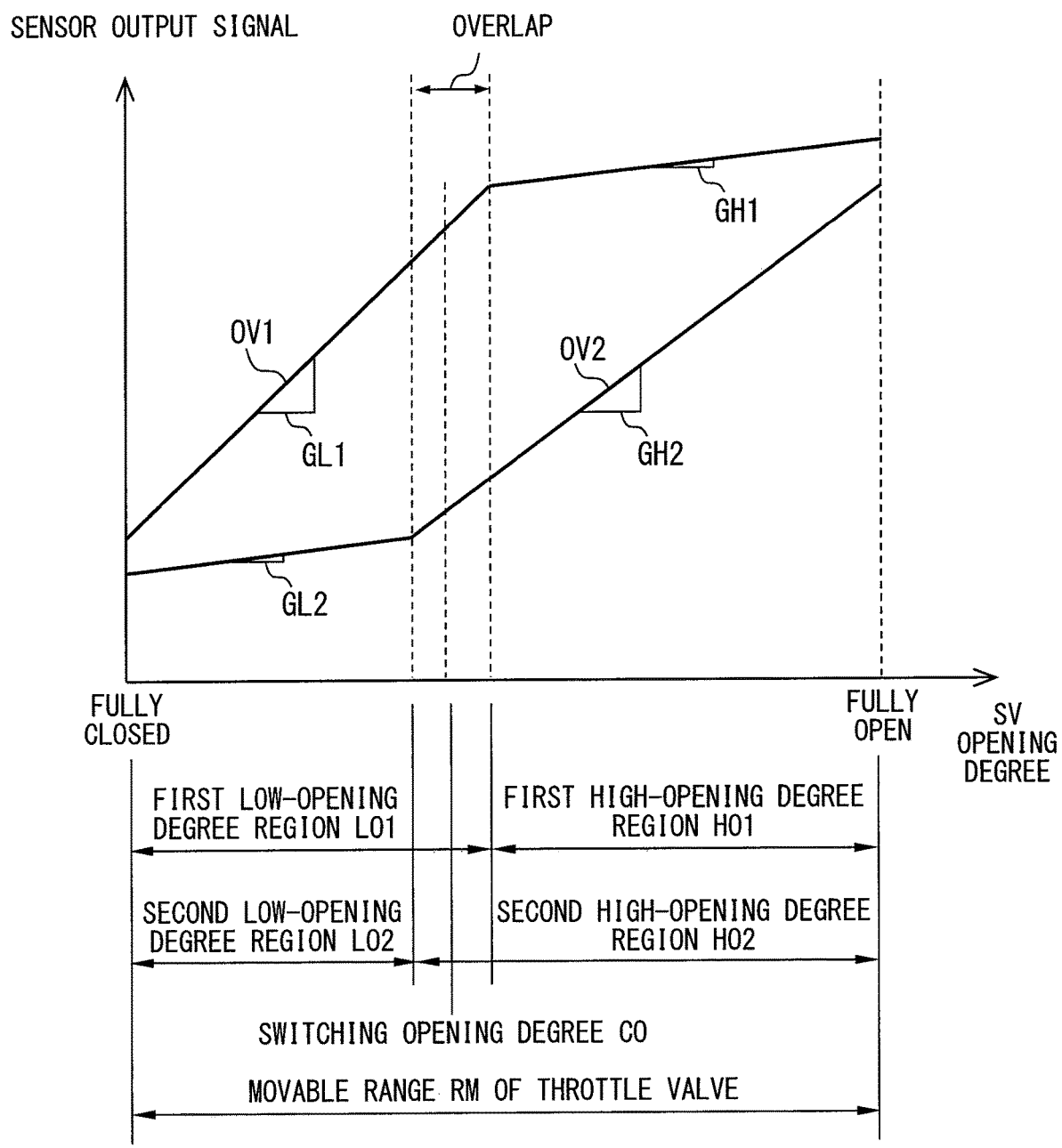
FIG. 16 is a graph showing the correlation of the throttle valve opening degree and the output value of each sensor, according to a seventh embodiment of the present disclosure.

A seventh embodiment shown in FIG. 16 is another modification example of the first embodiment. According to the seventh embodiment, both the first output value OV1 and the second output value OV2 monotonically increase in response to the increase of the throttle valve opening degree. In the correlation line that indicates the correlation between the throttle valve opening degree and the first output value OV1, the slope GL1 of the part of the first low-opening degree region LO1 is greater than the slope GH1 of the part of the first high-opening degree region HO1. Similarly, in the correlation line that indicates the correlation between the throttle valve opening degree and the second output value OV2, the slope GH2 of the part of the second high-opening degree region HO2 is greater than the slope GL2 of the part of the second low-opening degree region LO2. The switching opening degree CO is defined in an opening degree region where the first low-opening degree region LO1 overlaps the second high-opening degree region HO2. According to the seventh embodiment as the above description, even though the output values OV1 and OV2 monotonically increase in the movable range RM, the angle detection mechanism can execute the failure detection in the entire region of the movable range RM and can achieve the opening degree determination with a high precision in a wide opening degree range.

Eighth Embodiment

Figure 17:
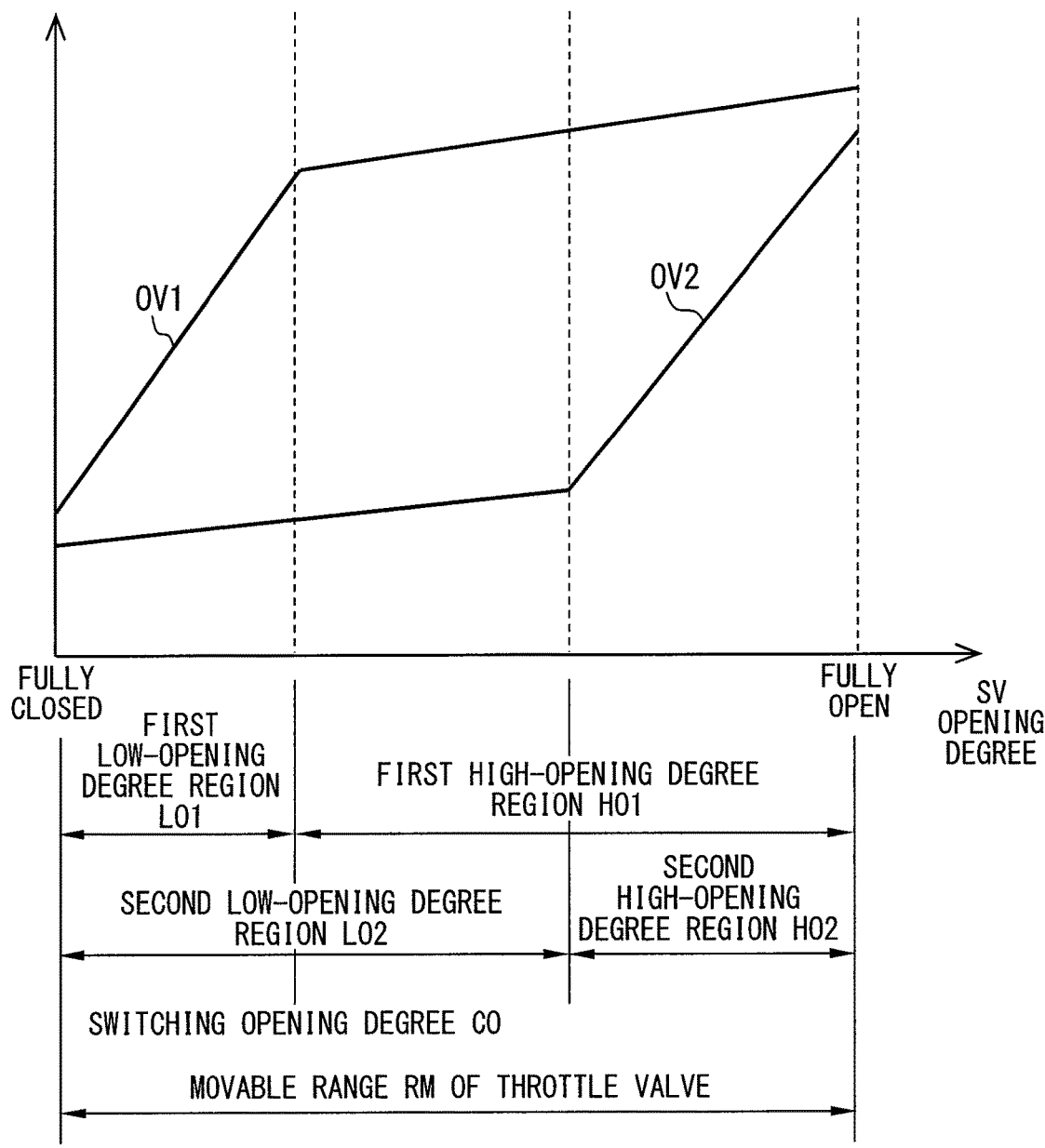
FIG. 17 is a graph showing the correlation of the throttle valve opening degree and the output value of each sensor, according to an eighth embodiment of the present disclosure.

An eighth embodiment shown in FIG. 17 is a modification example of the seventh embodiment. According to the eighth embodiment, the boundary between the first low-opening degree region LO1 and the first high-opening degree region HO1 in the first output value OV1 is set to be at a low-opening degree side of the boundary between the second low-opening degree region LO2 and the second high-opening degree region HO2 in the second output value OV2. In other words, ranges of the first sensor 71 (refer to FIG. 2) and the second sensor 72 (refer to FIG. 2) where the detection can be executed by a high resolution do not overlap. According to the eighth embodiment with the above setting, the boundary between the first low-opening degree region LO1 and the first high-opening degree region HO1 is set at the switching opening degree CO. Then angle determination unit switches the selection sensor between the first sensor 71 and the second sensor 72, at the boundary between the first low-opening degree region LO1 and the first high-opening degree region HO1. Similar to the seventh embodiment, according to the eighth embodiment as the above description, the angle detection mechanism can execute the failure detection in the entire region of the movable range RM and can achieve the opening degree determination with a high precision in a wide opening degree range.

Other Embodiments

Although the embodiments have been described above, the present disclosure is not construed as being limited to the above-described embodiments, but may be applied to various embodiments and combinations without departing from the gist of the present disclosure.

Figure 18:
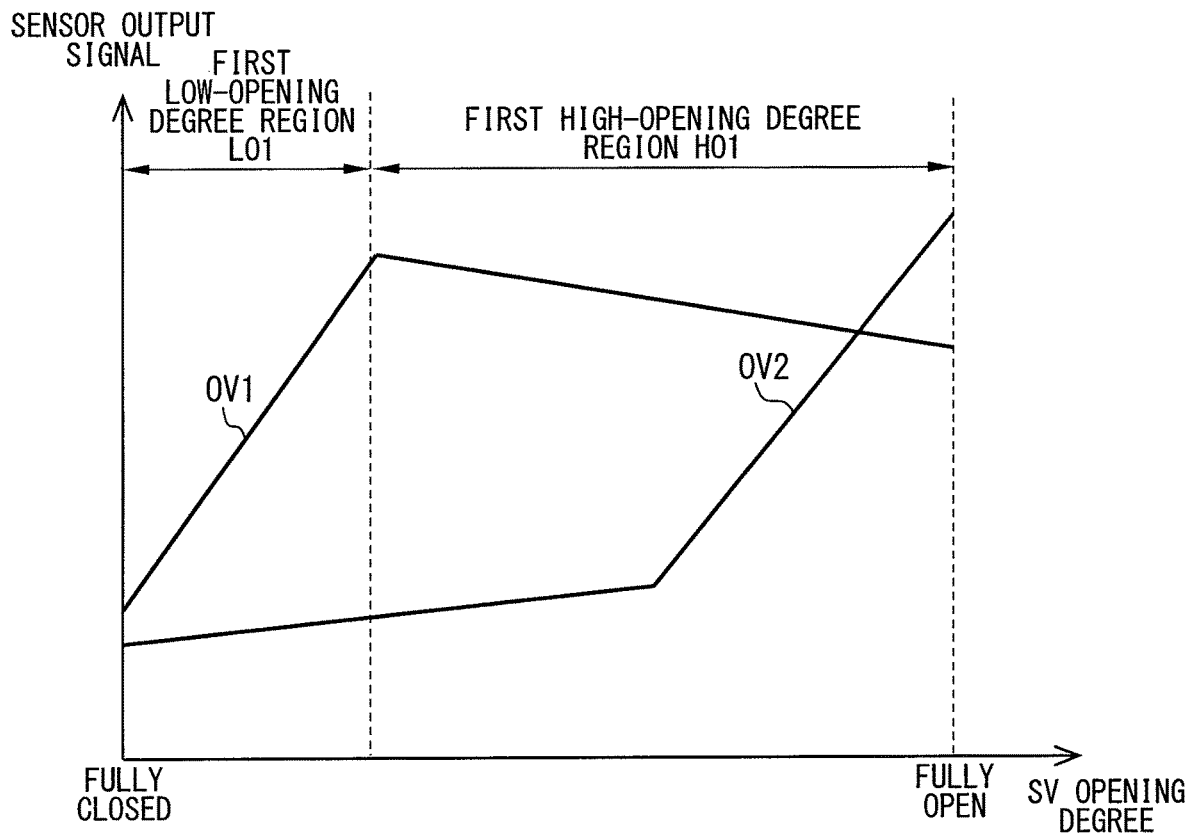
FIG. 18 is a graph showing the correlation of the throttle valve opening degree and the output value of each sensor, according to a first modification example.

In a first modification example of the eighth embodiment, as shown in FIG. 18, the first output value OV1 monotonously increases at the first low-opening degree region LO1 in the movable range RM and monotonously decreases at the first high-opening degree region HO1 of the movable range RM. Even though a region where one of the output values OV1 and OV2 increase in response to the increase of the throttle valve opening degree and a region where the one of the output values OV1 and OV2 decreases in response to the increase of the throttle valve opening degree are both set, the angle detection mechanism can execute the failure detection in the entire region of the movable range RM and can execute the opening degree determination with a high precision in a wide range.

Figure 19:
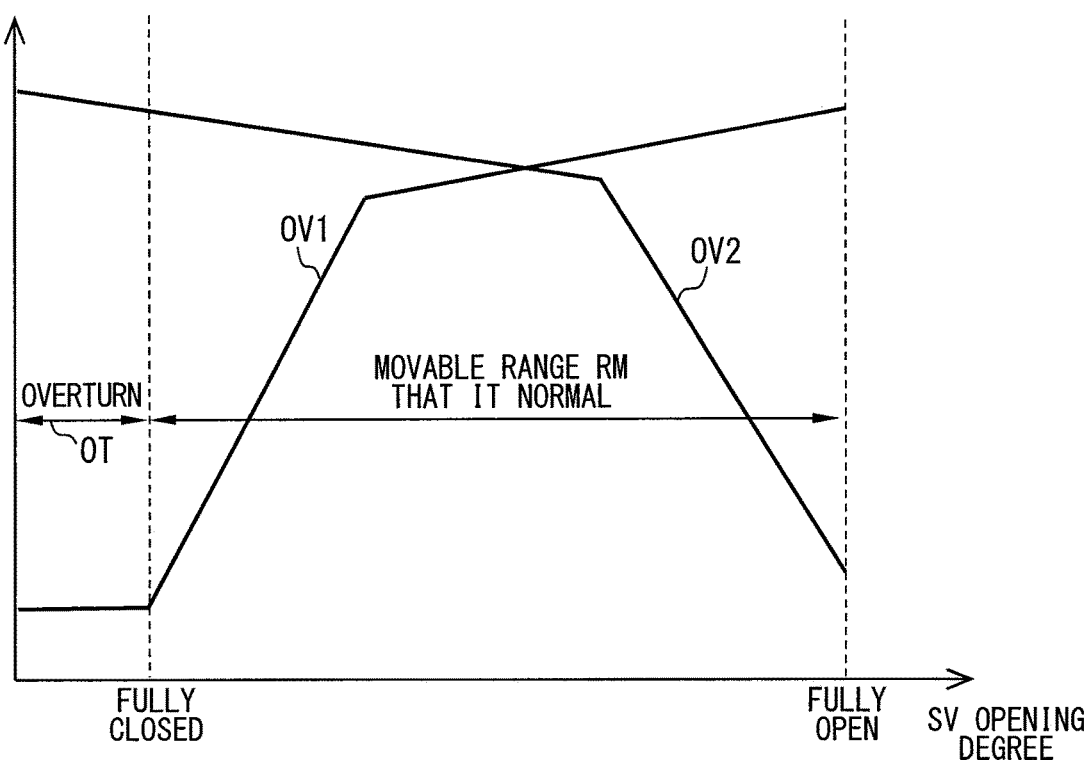
FIG. 19 is a graph showing the correlation of the throttle valve opening degree and the output value of each sensor, according to a second modification example.

In a second modification example of the fifth embodiment, as shown in FIG. 19, at the overturn range OT different from the movable range RM that is normal, the first output value OV1 is set to be constant without respect to the throttle valve opening degree. In the movable range RM that is normal, changes of the first output value OV1 and the second output value OV2 relative to a variation quantity of the throttle valve opening degree are neither zero. According to the above setting, the angle detection mechanism can execute the failure detection in the entire region of the movable range RM without the overturn range OT, even though the first output value OV1 is set to be constant in the overturn range OT.

Figure 20:
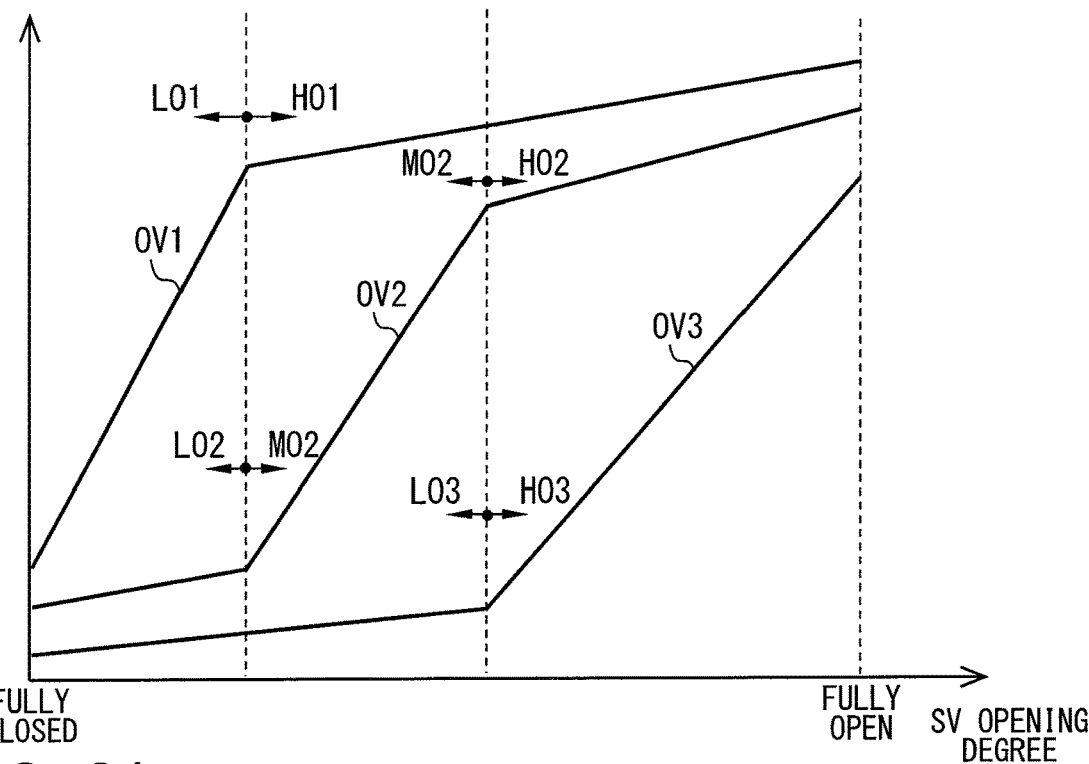
FIG. 20 is a graph showing the correlation of the throttle valve opening degree and the output value of each sensor, according to a third modification example.

In a third modification example of the sixth embodiment, as shown in FIG. 20, the boundary between the first low-opening degree region LO1 and the first high-opening degree region HO1 in the first output value OV1 and the boundary between the second low-opening degree region LO2 and the second intermediate-opening degree region MO2 in the second output value OV2 are set to be substantially the same opening degree. In addition, the boundary between the second intermediate-opening degree region MO2 and the second high-opening degree region HO2 and the boundary between the third low-opening degree region LO3 and the third high-opening degree region HO3 in the third output value OV3 are set to be substantially the same opening degree. As the above description, when the boundaries of the regions of the sensors are even, the angle detection mechanism can enlarge the range to execute the opening degree determination with a high precision even though the overlap is not provided.

Figure 21:
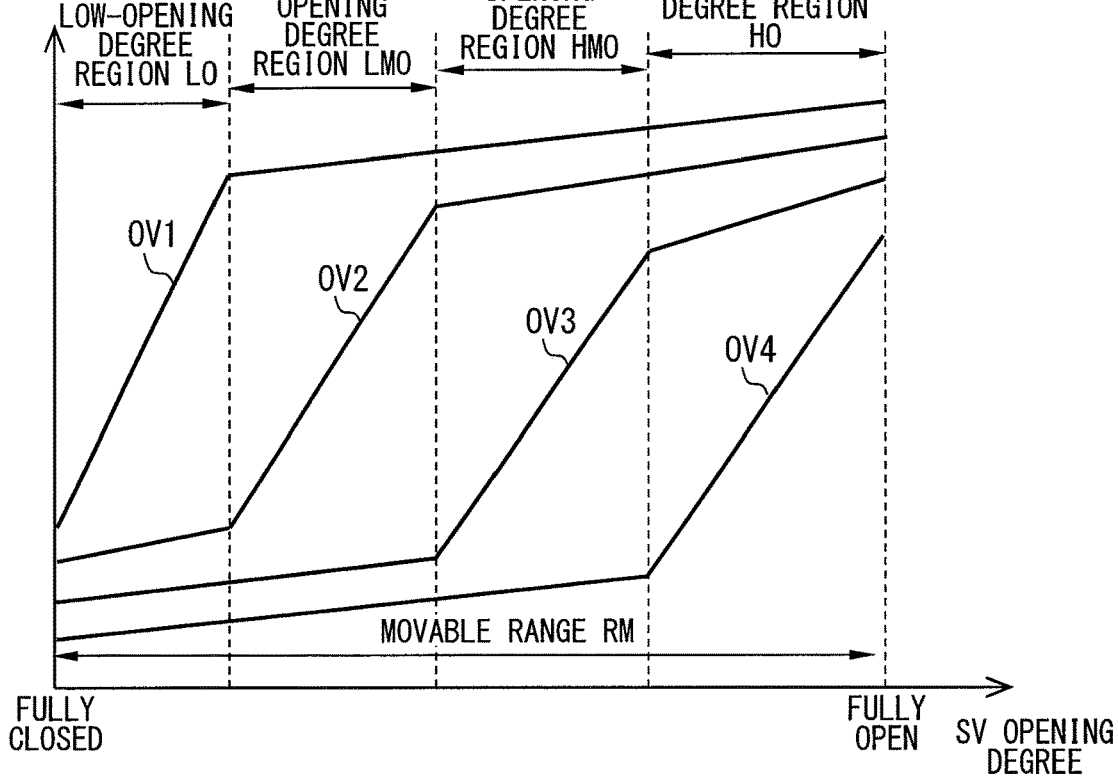
FIG. 21 is a graph showing the correlation of the throttle valve opening degree and the output value of each sensor, according to a fourth modification example.

The angle detection mechanism according to a fourth modification example of the sixth embodiment, as show in FIG. 21, can output a fourth output value OV4 in addition of the three output values OV1, OV2 and OV3. Four sensors (detection units) of the fourth modification example can execute the detection with a high resolution in opening degree regions different from each other. Specifically, the angle determination unit divides the movable range RM into the low-opening degree region LO, a low-speed side intermediate-opening degree region LMO, a high-speed side intermediate-opening degree region HMO and the high-opening degree region HO. At the low-opening degree region LO, the first output value OV1 is used in the opening degree determination. At the low-speed side intermediate-opening degree region LMO, the second output value OV2 is used in the opening degree determination. At the high-speed side intermediate-opening degree region HMO, the third output value OV3 is used in the opening degree determination. At the high-opening degree region HO, the fourth output value OV4 obtained by a fourth sensor is used in the opening degree determination. As the above description, a total number of the detection units located at an angle detection unit may be four or more.

According to the above embodiments, the angle detection mechanism of the present disclosure is applied to the electronic control throttle device that controls an intake air quantity at the internal combustion engine. However, the angle detection mechanism of the present disclosure, for example, may be applied to a valve device that controls a flow rate of an exhaust gas recirculation (EGR). Further, the rotation body where the rotation angle is detected by the angle detection mechanism may be a configuration different from the throttle valve that controls a flow rate. For example, the present disclosure may be applied to an accelerator device to provide an angle detection mechanism that detects a rotation angle of an accelerator pedal of the accelerator device.

According to the above embodiments, plural Hall IC are provided at the magnetism detection unit as plural detection units. However, a configuration of the magnetism detection unit may be appropriately modified as long as plural output values are available. For example, one Hall IC that can output output values with different characteristics may be provided at the magnetism detection unit, by providing plural detection systems including Hall element and signal processing circuits.

Further, the angle detection mechanism can execute the angle detection of the rotation body by using a detection unit different from the Hall IC. For example, the angle detection mechanism may have a configuration where a magnetic angle sensor (MR sensor) using a magnetoresistive element, or may be of an interactive type to detect the rotation angle of the rotation body by a change of an inductance. Further, the angle detection mechanism may detect the rotation angle of the rotation body by using a variable resistor.

The angle determination unit according to the above embodiments is located at a part of the engine control device. However, a vehicle control device different from the engine control device may constitute the angle determination unit. Alternatively, the angle determination unit may be achieved by an exclusive control device. While the present disclosure has been described with reference to the embodiments thereof, it is to be understood that the disclosure is not limited to the embodiments and constructions. The present disclosure is intended to cover various modifications and equivalent arrangements. In addition, while the various combinations and configurations, which are preferred, other combinations and configurations, including more, less or only a single element, are also within the spirit and scope of the present disclosure.

The invention claimed is:

1. An angle detection mechanism to detect a rotation angle of a rotation body by using a plurality of detection units which have different output characteristics, the angle detection mechanism comprising:
    a first detection unit to cause a first output value to constantly change in response to an angle change of the rotation body in the entire region of a specific rotation range of the rotation body which is previously defined and is a range necessary for a failure detection, the first detection unit to set a change quantity of the first output value relative to the angle change that is predetermined in a first rotation region that is a part of the specific rotation range to be greater than a change quantity in a rotation region of the specific rotation range other than the first rotation region that is a non-first rotation region of the specific rotation range; and
    a second detection unit to cause a second output value to constantly change in response to an angle change of the rotation body in the entire region of the specific rotation range, the second detection unit to set a change quantity of the second output value relative to the angle change that is predetermined in a second rotation region defined to include a rotation region in the specific rotation range different from the first rotation region to be greater than a change quantity in a rotation region of the specific rotation range other than the second rotation region that is a non-second rotation region of the specific rotation range, wherein
    the first rotation region includes a range that overlaps the non-second rotation region and is greater than a range of the first rotation region which overlaps the second rotation region.

2. The angle detection mechanism according to claim 1, wherein
    the first detection unit is configured to cause the first output value to either increase or decrease in response to the angle change of the rotation body in a specific rotation direction in the specific rotation range, and
    the second detection unit is configured to cause the second output value to either increase or decrease in response to the angle change of the rotation body in the specific rotation direction in the specific rotation range.

3. The angle detection mechanism according to claim 1, wherein
    the first rotation region includes a part that overlaps the second rotation region.

4. The angle detection mechanism according to claim 1, further comprising:
    a third detection unit to cause a third output value to constantly change in response to an angle change of the rotation body in the entire region of the specific rotation range, wherein
    the third detection unit is to set a change quantity of the third output value of the third detection unit relative to the angle change that is predetermined in a third rotation region defined to include a rotation region in the specific rotation range different from the first rotation region and the second rotation region to be greater than a change quantity in a rotation region of the specific rotation range other than the third rotation region that is a non-third rotation region of the specific rotation range.

5. The angle detection mechanism according to claim 1, wherein
    the first detection unit and the second detection unit are to cause the first output values and the second output value to constantly change in response to the angle change of the rotation body in an out-range region different from the specific rotation range of the rotation body.

6. The angle detection mechanism according to claim 1, wherein
    the rotation body includes a valve body to cause a flow rate of a fluid flowing through a passage to increase and decrease by rotating in the passage, and
    the specific rotation range is a range from a fully closed position of the valve body where the valve body substantially blocks the passage to a fully open position of the valve body where the flow rate of the fluid flowing through the passage is made to be maximum.

7. An angle detection system comprising:
an angle detection mechanism to detect a rotation angle of a rotation body by using a plurality of detection units which have different output characteristics;
an angle determination unit to select a selection detection unit using an output value among the plurality of the detection units, the angle determination unit to determine an angle position of the rotation body based on the output value of the selection detection unit, wherein
the angle detection mechanism includes
    a first detection unit to cause a first output value to constantly change in response to an angle change of the rotation body in the entire region of a specific rotation range of the rotation body which is previously defined, the first detection unit to set a change quantity of the first output value relative to the angle change that is predetermined in a first rotation region that is a part of the specific rotation range to be greater than a change quantity in a rotation region of the specific rotation range other than the first rotation region that is a non-first rotation region of the specific rotation range, and a second detection unit to cause a second output value to constantly change in response to an angle change of the rotation body in the entire region of the specific rotation range, the second detection unit to set a change quantity of the second output value relative to the angle change that is predetermined in a second rotation region defined to include a rotation region in the specific rotation range different from the first rotation region to be greater than a change quantity in a rotation region of the specific rotation range other than the second rotation region that is a non-second rotation region of the specific rotation range, the second rotation region is set to include a rotation region of a specific rotation direction of the rotation body relative to the first rotation region, the angle determination unit is to switch the selection detection unit from the first detection unit to the second detection unit at a first switching angle in response to a rotation of the rotation body from the first rotation region in the specific rotation direction, and switch the selection detection unit from the second detection unit to the first detection unit at a second switching angle in response to the rotation of the rotation body from the second rotation region in a direction opposite to the specific rotation direction, and the first switching angle is set to be in the specific rotation direction relative to the second switching angle.

* * * * *